US00RE47798E

(19) United States
(12) Reissued Patent
Tsukamoto et al.

(10) Patent Number: US RE47,798 E
(45) Date of Reissued Patent: Jan. 7, 2020

(54) DRIVING-SIDE PULLEY

(71) Applicant: KANZAKI KOKYUKOKI MFG. CO., LTD., Amagasaki-shi, Hyogo (JP)

(72) Inventors: Michio Tsukamoto, Amagasaki (JP); Takaya Inaoka, Amagasaki (JP)

(73) Assignee: Kanzaki Kokyukoki Mfg. Co., Ltd., Hyogo (JP)

(21) Appl. No.: 15/862,137

(22) Filed: Jan. 4, 2018

Related U.S. Patent Documents

Reissue of:
(64) Patent No.: 9,228,644
Issued: Jan. 5, 2016
Appl. No.: 14/166,584
Filed: Jan. 28, 2014

(30) Foreign Application Priority Data

Feb. 15, 2013 (JP) ..... 2013-027197

(51) Int. Cl.

| | |
|---|---|
| ***F16H 59/00*** | (2006.01) |
| ***F16H 61/00*** | (2006.01) |
| ***F16H 63/00*** | (2006.01) |
| ***F16H 9/18*** | (2006.01) |
| ***F16H 55/56*** | (2006.01) |
| ***F16H 63/06*** | (2006.01) |
| *F16H 61/21* | (2006.01) |

(52) U.S. Cl.
CPC ..... *F16H 9/18* (2013.01); *F16H 55/563* (2013.01); *F16H 63/067* (2013.01); *F16H 61/21* (2013.01)

(58) Field of Classification Search
CPC ..... F16H 55/563; F16H 9/18; F16H 63/067; F16H 61/21
USPC ..... 474/13, 14
See application file for complete search history.

(56) References Cited

U.S. PATENT DOCUMENTS

| | | | | | |
|---|---|---|---|---|---|
| 3,727,478 | A | * | 4/1973 | Erickson et al. | 474/14 |
| 3,759,111 | A | * | 9/1973 | Hoff | 474/14 |
| 3,777,583 | A | * | 12/1973 | Talbot | 474/14 |
| 3,861,229 | A | * | 1/1975 | Domaas | 474/14 |
| 3,939,720 | A | * | 2/1976 | Aaen et al. | 474/14 |
| 3,958,461 | A | * | 5/1976 | Aaen et al. | 474/14 |
| 3,961,539 | A | * | 6/1976 | Tremblay et al. | 474/14 |
| 4,027,544 | A | * | 6/1977 | Kobayashi | 474/14 |
| 4,464,144 | A | * | 8/1984 | Kobayashi | 474/14 |
| 4,483,686 | A | * | 11/1984 | Kobayashi et al. | 474/11 |
| 4,575,363 | A | * | 3/1986 | Burgess et al. | 474/14 |
| 5,209,703 | A | * | 5/1993 | Mastine et al. | 474/14 |
| 5,326,330 | A | * | 7/1994 | Bostelmann | 474/13 |
| 5,562,555 | A | * | 10/1996 | Peterson | 474/14 |
| 5,597,060 | A | * | 1/1997 | Huddleston et al. | 192/105 C |
| 5,647,810 | A | * | 7/1997 | Huddleston | 474/14 |
| 5,692,982 | A | * | 12/1997 | Peterson | 474/10 |
| 5,692,983 | A | * | 12/1997 | Bostelmann | 474/14 |

(Continued)

FOREIGN PATENT DOCUMENTS

| | | |
|---|---|---|
| JP | 2620490 B2 | 3/1997 |
| JP | 3524533 B2 | 2/2004 |

*Primary Examiner* — Cary E Wehner
(74) *Attorney, Agent, or Firm* — Sterne, Kessler, Goldstein & Fox P.L.L.C.

(57) ABSTRACT

A driving-side pulley includes a cam mechanism that presses a movable sleeve in a first direction by utilizing a relative rotation of the movable sleeve in the normal direction with respect to an axis-line-direction fixed member, the first direction being a direction that has a pressing surface pressed against a corresponding side surface of a belt.

25 Claims, 15 Drawing Sheets

(56) References Cited

U.S. PATENT DOCUMENTS

| | | | | |
|---|---|---|---|---|
| 5,795,255 | A * | 8/1998 | Hooper | 474/14 |
| 5,797,816 | A * | 8/1998 | Bostelmann | 474/14 |
| 6,149,540 | A * | 11/2000 | Johnson et al. | 474/14 |
| 6,309,317 | B1 * | 10/2001 | Joss | 474/13 |
| 6,334,826 | B1 * | 1/2002 | Takagi | 474/14 |
| 6,346,056 | B1 * | 2/2002 | Nouis et al. | 474/14 |
| 6,656,068 | B2 * | 12/2003 | Aitcin | 474/8 |
| 6,733,406 | B2 * | 5/2004 | Kitai et al. | 474/13 |
| 6,811,504 | B2 * | 11/2004 | Korenjak et al. | 474/14 |
| 6,958,024 | B2 * | 10/2005 | Takano | 474/14 |
| 7,217,204 | B2 * | 5/2007 | Roby | 474/14 |
| 8,409,039 | B2 * | 4/2013 | Beyer | 474/14 |
| 2002/0032088 | A1 * | 3/2002 | Korenjak et al. | F01B 1/12 474/14 |
| 2002/0042313 | A1 * | 4/2002 | Aitcin | 474/8 |
| 2002/0119846 | A1 * | 8/2002 | Kitai et al. | 474/14 |
| 2002/0123400 | A1 * | 9/2002 | Younggren et al. | 474/14 |
| 2002/0155909 | A1 * | 10/2002 | Roby | 474/14 |
| 2004/0110583 | A1 * | 6/2004 | Liang | 474/14 |
| 2004/0214668 | A1 * | 10/2004 | Takano | F16H 55/563 474/14 |
| 2009/0227404 | A1 * | 9/2009 | Beyer | 474/14 |
| 2011/0092325 | A1 * | 4/2011 | Vuksa et al. | 474/14 |
| 2012/0214626 | A1 * | 8/2012 | Cook | 474/14 |
| 2018/0180141 | A1 * | 6/2018 | Kuhl | F16H 9/18 |

* cited by examiner

Amended
FIG.15A
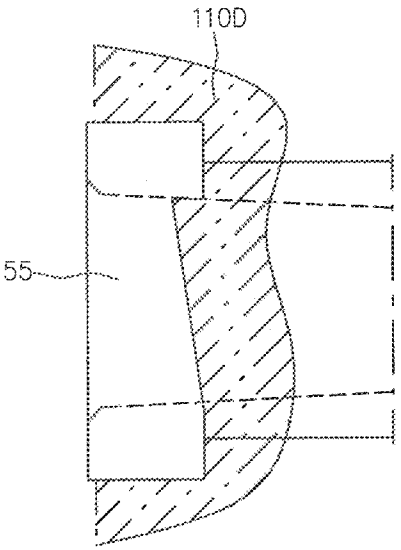
Amended

DRIVING-SIDE PULLEY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to a driving side pulley that is one component of a belt-type continuously variable transmission transmitting a rotational power from a driving shaft to a driven shaft while continuously varying a speed of the rotational power that has been transmitted in accordance with a change of a rotational speed of the driving shaft.

2. Related Art

There has been previously proposed a belt-type continuously variable transmission including a driving side pulley supported by a driving shaft, a driven-side pulley supported by a driven shaft, a V-belt wounded between both the pulleys, and transmitting a rotational power from the driving shaft to the driven shaft while continuously varying a speed of the rotational power, which has been transmitted to the drivers shaft, in accordance with a rotational speed of the driving shaft.

To explain in detail, the driving-side pulley includes a fixed sheave supported by the driving shaft in an immovable manner along an axis line of the driving shaft and in a non-rotatable manner around the axis line with respect thereto, a movable sheave supported by the driving shaft in a movable manner along the axis line of the driving shaft and in a non-rotatable manner around the axis line with respect thereto, a return spring pressing the movable sheave in a direction away from the fixed sheave, and a flyweight mechanism.

The flyweight mechanism presses the movable sheave in a direction toward the fixed sheave against a pressing force of the return spring with utilizing a centrifugal force that has a value corresponding to the rotational speed of the driving shaft.

Meanwhile, the belt-type continuously variable transmission is required to perform a belt clutch function when an engine is in an idle state and is also required to perform an engine braking function when a vehicle travels. The belt clutch function is a function that interrupts or reduces the power transmission from the driving shaft to the driven shaft so as to effectively prevent a creep phenomenon when the engine is in the idle state.

In order to achieve the two requirements, Japanese patent No. 2620490 discloses a driving-side pulley (hereinafter referred to as a first conventional configuration) including a fixed pulley immovable in the axis line of the driving shaft, a movable sheave movable in the axis line of the driving shaft, a one-way clutch that is interposed between the driving shaft and the fixed sheave and allows a power transmission only from the fixed sheave to the driving shaft while preventing a power transmission in a reverse direction, a return spring pressing the movable sheave in a direction away from the fixed sheave, a flyweight mechanism that presses the movable sheave in a direction toward the fixed sheave against a pressing force of the return spring with utilizing a centrifugal force that has a value corresponding to the rotational speed of the driving shaft, an auxiliary spring generating a force for pressing the movable sheave to one side surface of the belt in cooperation with the flyweight mechanism, and an engagement mechanism connecting the driving shaft and the fixed sheave with each other in a non-rotatable manner around the axis line as the movable sheave moves in a direction toward the fixed sheave by a predetermined distance.

In the first conventional configuration, when the engine is in an idle state, although the belt is brought into a tension state by pressing the movable sheave by the flyweight mechanism and the auxiliary spring, the rotational power is not transmitted from the driving shaft to the fixed sheave since the engagement mechanism is in a non-engagement state. Specifically, in this condition, the power transmission from the driving shaft to the belt is performed only via the movable sheave so that a torque of the rotational power that is transmitted from the driving shaft to the driven shaft is reduced, whereby the creep phenomenon can be prevented.

On the other hand, if the rotational speed of the driven shaft becomes higher than that of the driving shaft when the vehicle travels, the rotational power from the driven shaft is transmitted to the driving shaft from the belt via movable sheave as well as via the one-way clutch and the fixed sheave, whereby the engine braking function can be effectively performed.

However, the first conventional configuration has a problem in that the engine braking function cannot be sufficiently performed in a case where an operator releases an engine output operating member such as an accelerator pedal when the vehicle travels.

To explain in detail, if the engine output operating member is released when the vehicle travels, the belt moves inward in a radial direction with respect to the driving-side pulley and comes into contact with a bottom surface of a V-shaped groove of the driving-side pulley.

The fixed sheave that engages with one side surface (a first side surface) of the belt is immovable in the axis line direction. On the other hand, the movable sheave that engages with the other side surface (a second side surface) of the belt is subjected to the force generated by the flyweight mechanism when the engine is in an idle state and the force generated by the auxiliary spring, both the forces pressing the movable sheave in a direction toward the fixed sheave. However, the movable sheave is also subjected to the force generated by the return spring so as to press the movable sheave in a direction away from the fixed sheave.

More specifically, the movable sheave is pressed toward the fixed sheave only by a force obtained by subtracting the force generated by the return spring from a resultant force of the force generated by the flyweight mechanism and the force generated by the auxiliary spring.

That is, in the first conventional configuration, when the engine output operating member is released during traveling of the vehicle, the power transmission is mainly performed only through a path or a route extending from the inner circumferential surface of the belt to the bottom surface of the V-shaped groove. Therefore, enough frictional force cannot be obtained between the belt and the movable sheave and between the belt and the fixed sheave. As a result, the belt slips with respect to both the sheaves so that the engine braking function cannot be effectively performed.

In order to achieve the a above-mentioned two requirements, Japanese patent No. 3524533 discloses a driving-side pulley (hereinafter referred to as a second conventional configuration) including a fixed pulley that is immovable in the axis line and non-rotatable with respect to the driving shaft, a movable sheave that is movable in the axis line and non-rotatable with respect to the driving shaft, a return spring pressing the movable sheave in a direction away from the fixed sheave, a flyweight mechanism that presses the movable sheave in a direction toward the fixed sheave against a pressing force of the return spring with utilizing a centrifugal force that has a value corresponding to the rotational speed of the driving shaft, a collar that is inserted around the driving shaft so as to be rotatable with respect to both the sheaves and form the bottom surface of the V-shaped groove by its outer circumferential surface, and a one-way clutch that is interposed between the driving shaft and the collar so as to allow a power transmission only from the collar to the driving shaft while preventing a power transmission in a reverse direction, wherein the collar is provided with a conical surface coming into contact with a first side surface of the belt that is positioned on a side near the fixed sheave when the belt is moved onto the bottom surface of the V-shaped groove.

In the second conventional configuration, when the engine is in an idle state, the belt is positioned so that the first side surface comes into contact with the conical surface of the collar and the inner circumferential surface comes into contact with the outer circumferential surface of the collar while a second side surface coming into contact with the movable sheave. As explained earlier, the power transmission from the driving shaft to the collar is interrupted by the one-way clutch. Accordingly, the power transmission from the driving shaft to the belt is performed only via the movable sheave so that a torque of the rotational power that is transmitted from the driving shaft to the driven shaft is reduced, whereby the creep phenomenon can be prevented.

On the other hand, if the rotational speed of the driven shaft becomes higher than that of the driving shaft when the vehicle travels, the rotational power from the driven shaft is transmitted to the driving shaft from the belt via movable sheave as well as via the collar and the one-way clutch, whereby the engine braking function can be effectively performed.

However, as with the first conventional configuration, the second conventional configuration has a problem in that the engine braking function cannot be sufficiently performed in a case where an operator releases the engine output operating member when the vehicle travels.

To explain in detail, if the engine output operating member is released when the vehicle travels, the belt moves inward in a radial direction with respect to the driving-side pulley and comes into contact with the bottom surface of the V-shaped groove of the driving-side pulley.

The collar that engages with the first side surface of the belt is immovable in the axis line direction. On the other hand, although the movable sheave that engages with the second side surface of the belt is subjected to the force generated by the flyweight mechanism so as to press the movable sheave in a direction toward the fixed sheave, the movable sheave is also subjected to the force generated by the return spring so as to press the movable sheave in a direction away from the fixed sheave.

More specifically, the movable sheave is pressed toward the fixed sheave only by a force obtained by subtracting the force generated by the return spring from the force generated by the flyweight mechanism when the engine in the idle state.

That is, as in the first conventional configuration, in the second conventional configuration, the power transmission is mainly performed only through a path or a route extending from the inner circumferential surface of the belt to the bottom surface of the V-shaped groove when the engine output operating member is released during traveling of the vehicle. Therefore, enough frictional force cannot be obtained between the belt and the collar and between the belt and the movable sheave. As a result, the belt slips with respect to the collar and the movable sheave so that the engine braking function cannot be effectively performed.

SUMMARY OF THE INVENTION

In view of the prior art, it is an object of the present invention to provide a driving-side pulley that is one component of a belt-type continuously variable transmission that transmits a rotational power from a driving shaft to a driven shaft while continuously changing a speed of the rotational power that has been transmitted to the driven shaft in accordance with a rotational speed of the driving shaft, the driving-side pulley being capable of realizing an engine braking function with a sufficient capacity when an engine output operating member is released during a traveling of a vehicle while realizing a belt clutch function when a rotational speed of an engine output is an idle rotational speed.

In order to achieve the object, the present invention provides a driving-side pulley forming one component of a belt-type continuously variable transmissions that transmits a rotational power from a driving shaft to a driven shaft while continuously changing a speed of the rotational power that is transmitted to the driven shaft in accordance with a rotational speed of the driving shaft, the driving-side pulley including a fixed sheave immovable along an axis line and non-rotatable around the axis line with respect to the driving shaft, a movable sheave movable along the axis line and non-rotatable around the axis line with respect to the driving shaft, a return spring pressing the movable sheave in a direction away from the fixed sheave and a flyweight mechanism pressing the movable sheave in a direction toward the fixed sheave with a force having an amount corresponding to the rotational speed of the driving shaft against a pressing force of the return spring, wherein the fixed sheave is provided with a fixed sheave-side engagement surface capable of engaging with a first side surface of a belt while the movable sheave is provided with a movable sheave-side engagement surface that is capable of engaging with a second side surface of the belt and forms, in cooperation with the fixed sheave-side engagement surface, a V-shaped groove into which the belt is engaged, wherein the driving-side pulley includes a movable sleeve inserted around an axis-line-direction fixed member, which is formed by the driving shaft or the fixed sheave, in a movable manner along the axis line and in a rotatable manner around the axis line with respect thereto, and a one-way clutch inserted around the movable sleeve in such a manner as to form a bottom surface of the V-shaped groove, wherein the movable sleeve includes a tubular portion inserted around the axis-line-direction fixed member and a flange portion extending outward in a radial direction from the tubular portion, wherein the one-way clutch includes an inner ring body inserted around the tubular portion in a non-rotatable manner with respect thereto and an outer ring body surrounding the inner ring body and forming the bottom surface of the V-shaped groove, and is configured so that only a rotational power generated by a rotation of the outer ring body in a normal direction is transmitted to the inner ring body, wherein the flange portion is provided with a pressing surface capable of engaging with one of the first and second side surfaces of the belt in a state where the inner circumferential surface of the belt engages with the outer ring body, and wherein the driving-side pulley further includes a cam mechanism that presses the movable sleeve in a first direction by utilizing a relative rotation of the movable sleeve in the normal direction with respect to the axis-line-direction fixed member, the first direction being a direction that has the pressing surface pressed against a corresponding side surface of the belt.

The driving-side pulley according to the present invention makes it possible to realize the engine braking function with a sufficient capacity when the engine output operating member is released during the traveling of the vehicle while preventing or reducing a power transmission from the driving shaft to a belt when the rotational speed of tine engine output is an idle rotational speed to effectively prevent an unintentional creep phenomenon.

Preferably, the driving-side pulley according to the present invention may include an auxiliary spring that presses the movable sleeve in a second direction along the axis line that is opposite the first direction.

In one embodiment, the flange portion of the movable sleeve extends outward in a radial direction from an end portion of the tubular portion that is positioned on a side close to the fixed sheave and is configured so that the pressing surface is capable of engaging with the first side surface of the belt, and the fixed sheave is provided with a concave portion that is arranged inward of the fixed sheave-side engagement surface in the radial direction and into which the flange portion of the movable sleeve can be engaged. In this case, when the movable sheave is pressed in a direction toward the fixed sheave by the flyweight mechanism that generates a force having an amount corresponding to the rotational speed of the driving shaft, the movable sleeve is moved via the belt by the movable sheave in a second direction opposite the first direction in the axis line to an initial position in which the flange portion is engaged into the concave portion, and the pressing surface is positioned on the same plane as the fixed sheave-side engagement surface when the movable sleeve is positioned at the initial position.

In the one embodiment, the fixed sheave side engagement surface and the pressing surface are preferably arranged with respect to the radial direction in such a manner that both the surfaces engage with first side surface of the belt when the inner circumferential surface of the belt engages with the outer ring body while the movable sleeve is positioned at the initial position.

The driving-side pulley according to the one embodiment may further include a spider that is arranged on a side opposite the fixed sheave across the movable sheave and is immovable along the axis line and non-rotatable around the axis line with respect to the driving shaft, and a base member that is arranged on a side opposite the movable sheave across the spider and is connected to the movable sheave via a connecting member.

In this case, the flyweight mechanism includes a flyweight that is arranged between the movable sheave and the spider and swings outward in a radial direction of the driving shaft in accordance with the rotational speed of the driving shaft, the return spring is arranged between the spider and the base member, and the auxiliary spring is arranged inward of the flyweight with respect to the radial direction while being arranged between the spider and an end portion of the tubular portion that is on a side opposite the flange portion with respect to the axis line direction.

In any one of the above-mentioned various configurations, the cam mechanism may include a convex-like member provided at one of the axis-line-direction fixed member and the tubular portion, and a spiral groove provided at the other one of the axis-line-direction fixed member and the tubular portion in such a manner as that the convex-like member can be engaged into the spiral groove.

In a configuration including the auxiliary spring, one of the fixed sheave and the movable sheave that engages with the side surface of the belt facing the pressing surface is formed with a concave portion that is arranged inward of the engagement surface of the one sheave in the radial direction and into which the flange portion of the movable sleeve can be engaged, so that the movable sleeve is pressed by the auxiliary spring toward the initial position in which the flange portion is engaged into the concave portion at a normal state in which the cam mechanism does not apply the pressing force in the first direction along the axis line to the movable sleeve.

In the thus configuration, the cam mechanism may include an engagement groove provided at one of a rear surface of the flange portion that is opposite the pressing surface and a bottom surface of the concave portion, and a convex-like portion provided at the other one of the rear surface and the bottom surface in such a manner as to be engaged into the engagement groove.

In this case, the engagement groove is configured so as to include a deepest area with which the convex-like portion engages when the movable sleeve is positioned at the initial position, and an inclined area with which the convex-like portion engages when the movable sleeve rotates in a normal direction around the axis line with respect to the axis-line-direction fixed member from a state where the convex-like portion engages with the deepest area.

The inclined area is inclined in such a manner as that an engagement point at which the convex-like portion engages with the inclined area becomes narrower as the movable sleeve farther rotates in the normal direction around the axis line with respect to the axis-line-direction fixed member.

BRIEF DESCRIPTION OF THE DRAWINGS

The above, and other objects, features and advantages of the present invention will become apparent from the detailed description thereof in conjunction with the accompanying drawings therein.

FIGS. 15A and 15B are cross sectional views taken along line XV-XV in FIG. 14, and show a state in which there is no difference in a relative rotation between a reference sheave and a driving shaft, and a state in which the reference sheave rotates around an axial line in a normal direction relative to the driving shaft, respectively.

DETAILED DESCRIPTION OF THE PREFERRED EMBODIMENTS

First Embodiment

Figure 1:
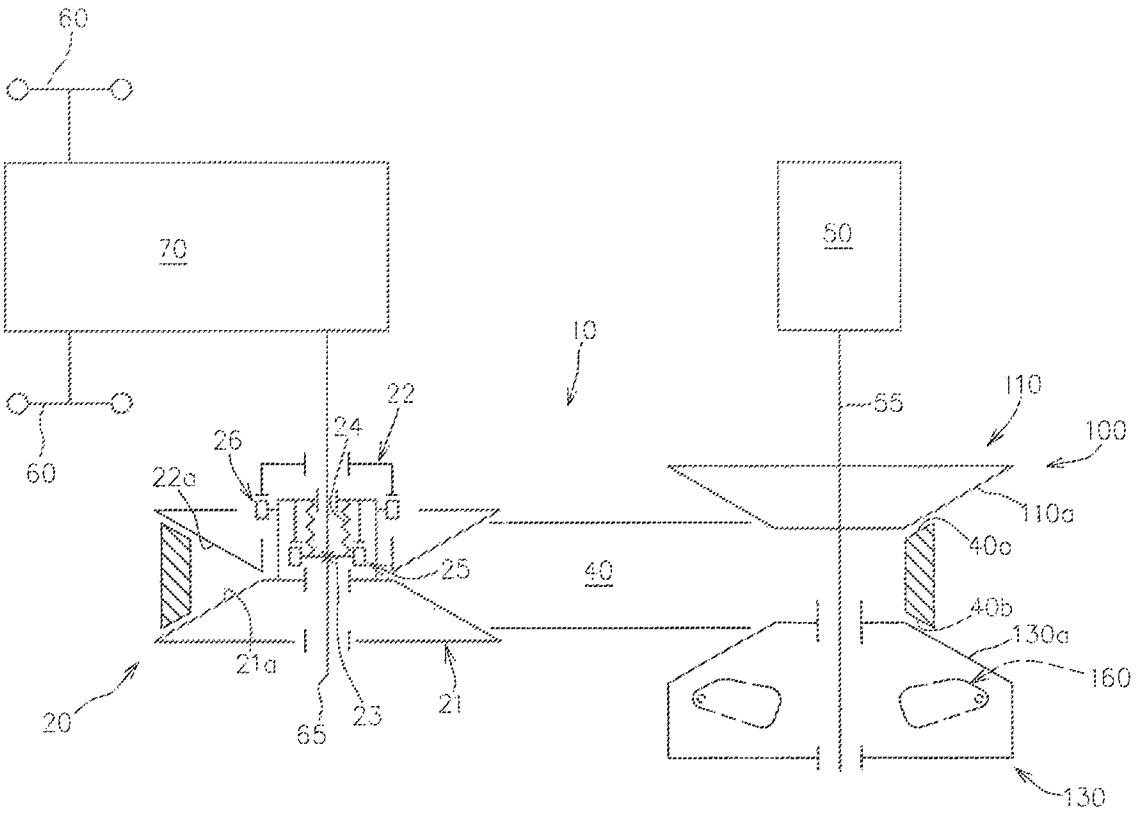
FIG. 1 is a schematic view of a traveling system power transmitting path to which a belt-type continuously variable transmission inclusive of a driving-side pulley according to a first embodiment of the present invention is applied.

Hereinafter, one embodiment of a driving-side pulley according to the present invention will be explained, with reference to the attached drawings.

The driving-side pulley 100 forms a belt-type continuously variable transmission 10 in cooperation with a driven-side pulley 20 and a belt 40 such as a V-belt.

The belt-type continuously variable transmission 10 is interposed in a traveling system power transmitting path extending from a driving power source 50 such as an engine to a driving wheel 60, for example.

FIG. 1 is a schematic view of the traveling system power transmitting path to which the belt-type continuously variable transmission 10 is applied.

As shown in FIG. 1, the belt-type continuously variable transmission 10 performs a variable speed-change operation between a driving shaft 55 operatively connected to the driving power source 50 and a driven shaft 65 operatively connected to the driving wheel 60, and includes the driving-side pulley 100 supported by the driving shaft 55, the driven-side pulley 20 supported by the driven shaft 65 and the belt 40 wound, around the driving-side pulley 100 and the driven-side pulley 20. *The driven shaft 65 is operatively connected to the driving wheel 60 by a transmission 10.*

As shown in FIG. 1, the driven-side pulley 20 includes a driven-side fixed sheave 21 supported by the driven shaft 65 in a rotatable manner around the axis line with respect thereto and in an immovable manner along the axis line direction thereof, a driven-side movable sheave 22 supported by the driven shaft 65 in a rotatable manner around the axis line with respect thereto and in a movable manner along the axis line direction thereof, a spider 23 supported by the driven shaft 65 in a non-rotatable manner around the axis line with respect thereto and in an immovable manner along the axis line, and a biasing member 24 that presses the driven-side movable sheave 22 in a downshift direction toward the driven-side fixed sheave 21.

The driven-side fixed sheave 21 has a fixed sheave-side engagement surface 21a that engages with one side surface of the belt 40 and the driven-side movable sheave 22 has a movable sheave-side engagement surface 22a that engages with the other side surface of the belt 40 so that both the engagement surfaces 21a, 22a form a V-shaped groove into which the belt is engaged.

As shown in FIG. 1, the driven-side pulley 20 further includes a main torque-cam mechanism 25 that presses the driven-side movable sheave 22 in the downshift direction by a force having an amount in accordance with a relative difference in a rotational angle between the spider 23 and the driven-side movable sheave 22 and a sub torque-cam mechanism 26 that presses the driven-side movable sheave 22 along the axis line of the driven shaft 65 by a force having an amount in accordance with the relative difference in the rotational angle between the driven-side fixed sheave 21 and the driven-side movable sheave 22

The sub torque-cam mechanism 26 can be configured so as to generate a pressing force for the driven-side movable sheave 22 in a direction (that is, the downshift direction) same as or a direction (that is, a upshift direction) opposite to the direction in which the main torque-cam mechanism 25 presses the driven-side movable sheave 22 in accordance with a specification or requirement.

Figure 2:
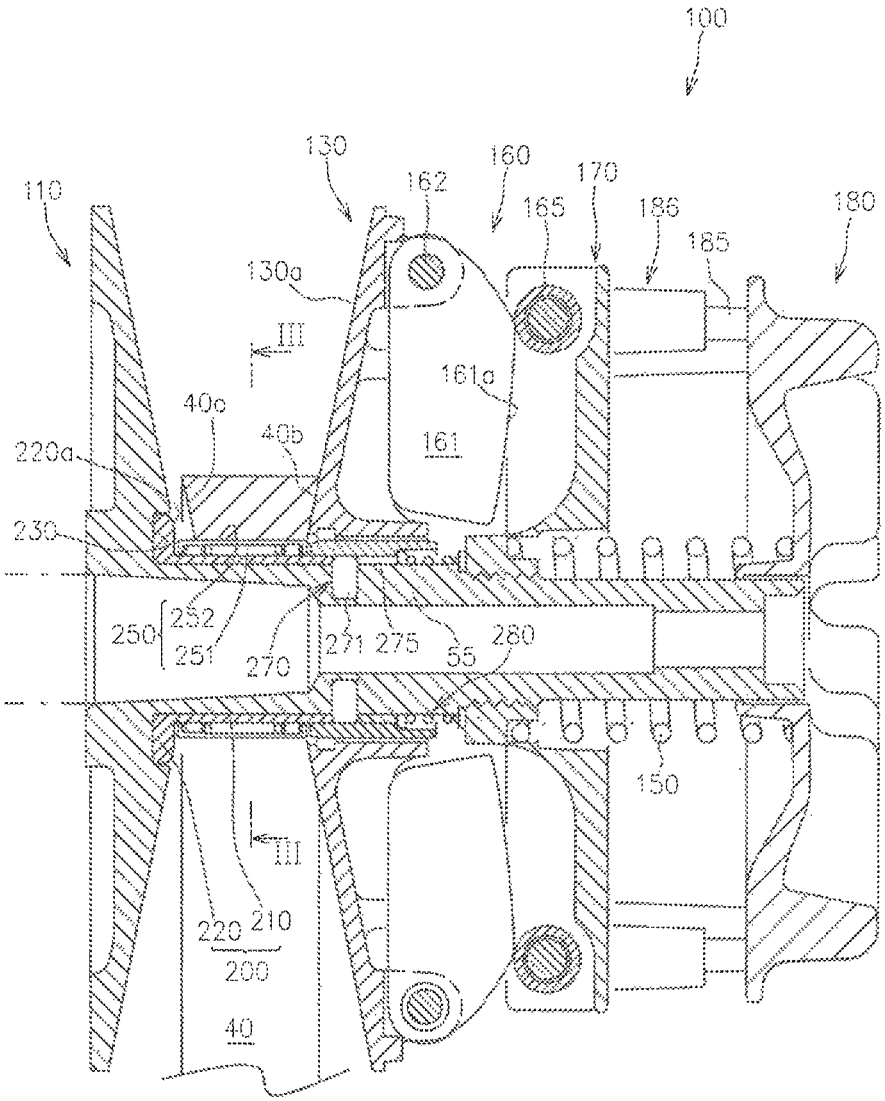
FIG. 2 is a vertical cross sectional view of the driving-side pulley according to the first embodiment.

FIG. 2 is a vertical cross sectional view of the driving-side pulley 100. As shown in FIGS. 1 and 2, the driving-side pulley 100 is configured so that an effective radius of the belt 40, which is a distance from an axial center of the corresponding driving shaft 55 to a position on which the belt 40 runs in the driving-side pulley 100, varies in accordance with a rotational speed of the driving shaft 55 that varies in accordance with a manual operation or the like.

That is, the driving-side pulley 100 is configured so that the effective radius of the belt 40 becomes larger as the rotational speed of the driving shaft 55 increases and the effective radius of the belt 40 becomes smaller as the rotational speed of the driving shaft 55 decreases.

In particular, as shown in FIGS. 1 and 2, the driving-side pulley 100 includes a driving-side fixed sheave 110, a driving-side movable sheave 130, a return spring 150 and a flyweight mechanism 160.

The driving-side fixed sheave 110 is immovable along the axis line and non-rotatable around the axis line with respect to the driving shaft 55, and includes a fixed sheave-side engagement surface 110a capable of engaging with the first side surface 40a of the belt 40.

As shown in FIG. 2, in the present embodiment, the driving-side fixed sheave 110 is integrally formed with the driving shaft 55. It is of course possible that the driving-side fixed sheave 110 is formed separately from the driving shaft 55 and is detachable connected to the driving shaft 55 via screw connection or the like.

The driving-side movable sheave 130 is movable along the axis line and non-rotatable around the axis line with respect to the driving shaft, and includes a movable sheave-side engagement surface 130a capable of engaging with the second side surface 40b of the belt 40.

The movable sheave-side engagement surface 130a forms, in cooperation with the fixed sheave-side engagement surface 110a, the V-shaped groove into which the belt 40 is engaged.

In the present embodiment, the driving-side movable sheave 130 is inserted around the driving shaft 55 in a movable manner along the axis line, and is non-rotatable around the axis line with respect to the driving shaft 55 via a spider 170.

Specifically, as shown in FIG. 2, the driving-side pulley 100 further includes the spider 170 arranged on a side opposite the driving-side fixed sheave 110 across the driving-side movable sheave 130, and a base member 180 arranged on a side opposite the driving-side movable sheave 130 across the spider 170.

The spider 170 is immovable along the axis line and non-rotatable around the axis line with respect to the driving shaft 55 by a screw connection or the like.

The base member 180 is connected to the driving-side movable sheave 130 via a connecting member 185 so that moves along with the driving-side movable sheave 130.

The connecting member 185 and the spider 170 are provided with an engagement structure 186 that hose the driving-side movable sheave 130 and the spider 170 engaged with each other so that they integrally rotate around the axis line, whereby the movable sheave 130 is non-rotatable around the axis line with respect to the driving shaft 55.

The return spring 150 presses the driving-side movable sheave 130 in a direction away from the driving-side fixed sheave 110.

As shown in FIG. 2, in the present embodiment, the return spring 150 is arranged between the spider 170 and the base member 180 so that the return spring 150 presses the driving-side movable sheave 130 in the direction away from the driving-side fixed sheave 110 via the base member 180 and the connecting member 185.

The flyweight mechanism 160 generates the centrifugal force that has the value corresponding to the rotational speed of the driving shaft 55, and presses the driving-side movable sheave 130 in the direction toward the driving-side fixed sheave 110 with the centrifugal force against the pressing force of the return spring 150.

In the present embodiment, the flyweight mechanism 160 is provided at the driving-side movable sheave 130 and the spider 170.

Specifically, as shown in FIG. 2, the flyweight mechanism 160 includes a flyweight 161 provided at one (the driving-side movable sheave 130 in the illustrated embodiment) of the driving-side movable sheave 130 and the spider 170, and an engagement member 165 provided at the other (the spider 170 in the illustrated embodiment) of the driving-side movable sheave 130 and the spider 170.

The flyweight 161 includes an engagement surface 161a capable of engaging with the engagement member 165.

The flyweight 161 is capable of swinging around a pivotal shaft 162 that is positioned away from the driving shaft 55 in a radial direction and is orthogonal to the driving shaft 55 while the engagement surface 161a being engaged with the engagement member 165.

In the flyweight mechanism 160, the flyweight 161 swings outward in a radial direction of the driving shaft 55 around the pivotal shaft 162 as the rotational speed of the driving shaft 55 around the axis line increases, whereby the driving-side movable sheave 130 is pressed in a direction toward the driving-side fixed sheave 110 against the pressing force of the return spring 150.

Figure 3:
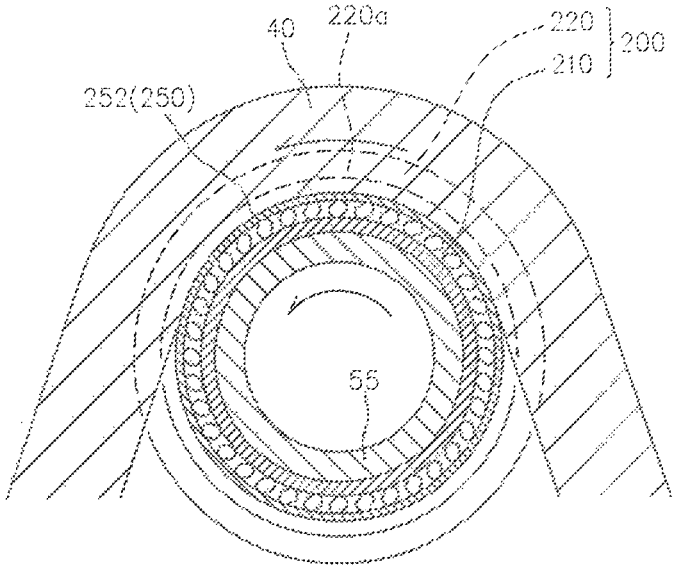
FIG. 3 is a cross sectional view taken along line in FIG. 2.

FIG. 3 is a cross sectional view taken along the line III-III in FIG. 2.

As shown in FIGS. 2 and 3, the driving-side pulley 100 according to the present embodiment further includes a movable sleeve 200 and a one-way clutch 250.

Figure 4:
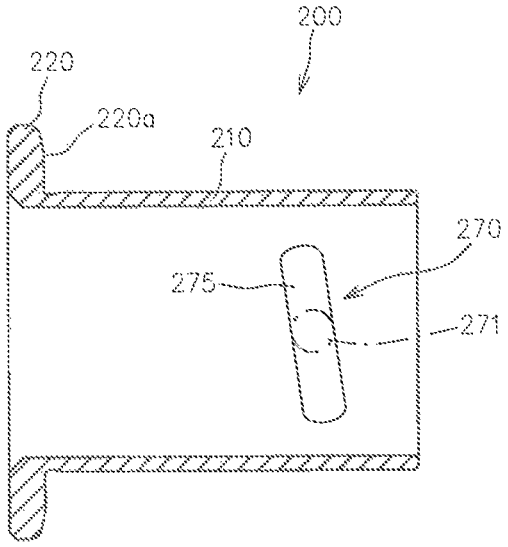
FIG. 4 is a vertical cross sectional view of a movable sleeve of the driving-side pulley according to the first embodiment.

FIG. 4 is a vertical cross sectional view of the movable sleeve 200.

As shown in FIGS. 2 to 4, the movable sleeve 200 is inserted around an axis-line-direction fixed member (the driving shaft 55 in the illustrated embodiment) that is embodied by the driving shaft 55 or the driving-side fixed sheave 110 in a movable manner along the axis line and in a rotatable manner around the axis line with respect thereto.

Specifically, as shown in FIGS. 2 to 4, the movable sleeve 200 includes a tubular portion 210 inserted around the axis-line-direction fixed member (the driving shaft 55 in the present embodiment) and a flange portion 220 extending outward in a radial direction from the tubular portion 210.

The driving-side fixed sheave 110 is formed integrally with the driving shaft 55 in the present embodiment. Alternatively, the driving-side fixed sheave 110 may be formed separately from the driving shaft 55 and be fixed thereto.

In the alternative configuration, the driving-side fixed sheave 110 may include a tubular main body portion inserted around the driving shaft 55 and a radial-direction extending portion that extends radially outward from the main body portion to form the fixed sheave-side engagement surface 110a. In this configuration, the tubular portion 210 of the movable sleeve 200 is inserted around the main body portion of the driving side fixed sheave 110.

As shown in FIGS. 2 and 3, the one-way clutch 250 is inserted around the movable sleeve 200 so as to form the bottom surface of the V-shaped groove, and transmits the rotational power only in a direction from the belt 40 to the movable sleeve 200.

Specifically, the one-way clutch 250 includes [an inner ring body 251 inserted around the tubular portion 210 in a non-rotatable manner with respect thereto and] an outer ring body 252 [surrounding the inner ring body 251] *inserted around the tubular portion 210* and forming the bottom surface of the V-shaped groove, and [is] *a needle roller 251* configured so [that] *as* only *to transmit* a rotational torque generated by a rotation of the outer ring body 252 in a normal direction [is transmitted] to the [inner ring body 251] *tubular portion 210.*

As shown in FIGS. 2 to 4, the flange portion 220 of the movable sleeve 200 is provided with a pressing, surface 220a capable of engaging with one of the first and second side surfaces 40a, 40b of the belt 40 in a state where the inner circumferential surface of the belt 40 engages with the bottom surface of the V-shaped groove (that is, the outer circumferential surface of the outer ring body 252).

In the present embodiment, as shown in FIG. 2, the pressing surface 220a is capable of engaging with the first side surface 40a of the belt 40.

That is, the flange portion 220 extends outward in a radial direction from an end portion of the tubular portion 210 that is positioned on a side close to the driving-side fixed sheave 110 so that the pressing surface 220a is capable of engaging with the first side surface 40a of the belt 40.

The driving-side pulley according to the present embodiment further includes a cam mechanism 270 that presses the movable sleeve 200 in a first direction by utilizing a relative rotation of the movable sleeve 200 in the normal direction with respect to the axis-line-direction fixed member, the first direction being a direction in which the pressing surface 220a is pressed against a corresponding side surface of the belt 40.

The cam mechanism 270 includes a convex-like member 271 provided at one of the axis-line-direction fixed member (the driving shaft 55 in the illustrated embodiment) and the tubular portion 210 of the movable sleeve 200, and a spiral groove 275 provided at the other one of the axis-line-direction fixed member and the tubular portion 210 in such a manner as that the convex-like member 271 can be engaged into the spiral groove 275.

As shown in FIGS. 2 and 4, in the present embodiment, the convex-like member 271 is provided at the axis-line-direction fixed member so as to extend outward in the radial direction thereof, while the spiral groove 275 is provided at the tubular portion 210.

The thus configured driving-side pulley 100 can realize a belt clutch function that effectively prevents a creep phenomenon when the engine is in the idle state and also can realize an engine braking function with a sufficient brake capacity when an engine output operating member is released during the traveling of the vehicle, the creep phenomenon being a phenomenon at which the rotational power is transmitted from the driving shaft 55 to the driven shaft 65 when the engine is in the idle state so that the driving wheel 60 is driven at a very low speed.

First, the belt clutch function by the driving-side pulley 100 will be explained.

The driving-side movable sheave 130 is pressed by the return spring 150 in the direction away from the driving-side fixed sheave 110. The flyweight mechanism 160 is configured so as not to generate such a pressing force to move the driving-side movable sheave 130 toward the driving-side fixed sheave 110 against the pressing force of the return spring 150 when the engine is in the idle state.

Figure 5:
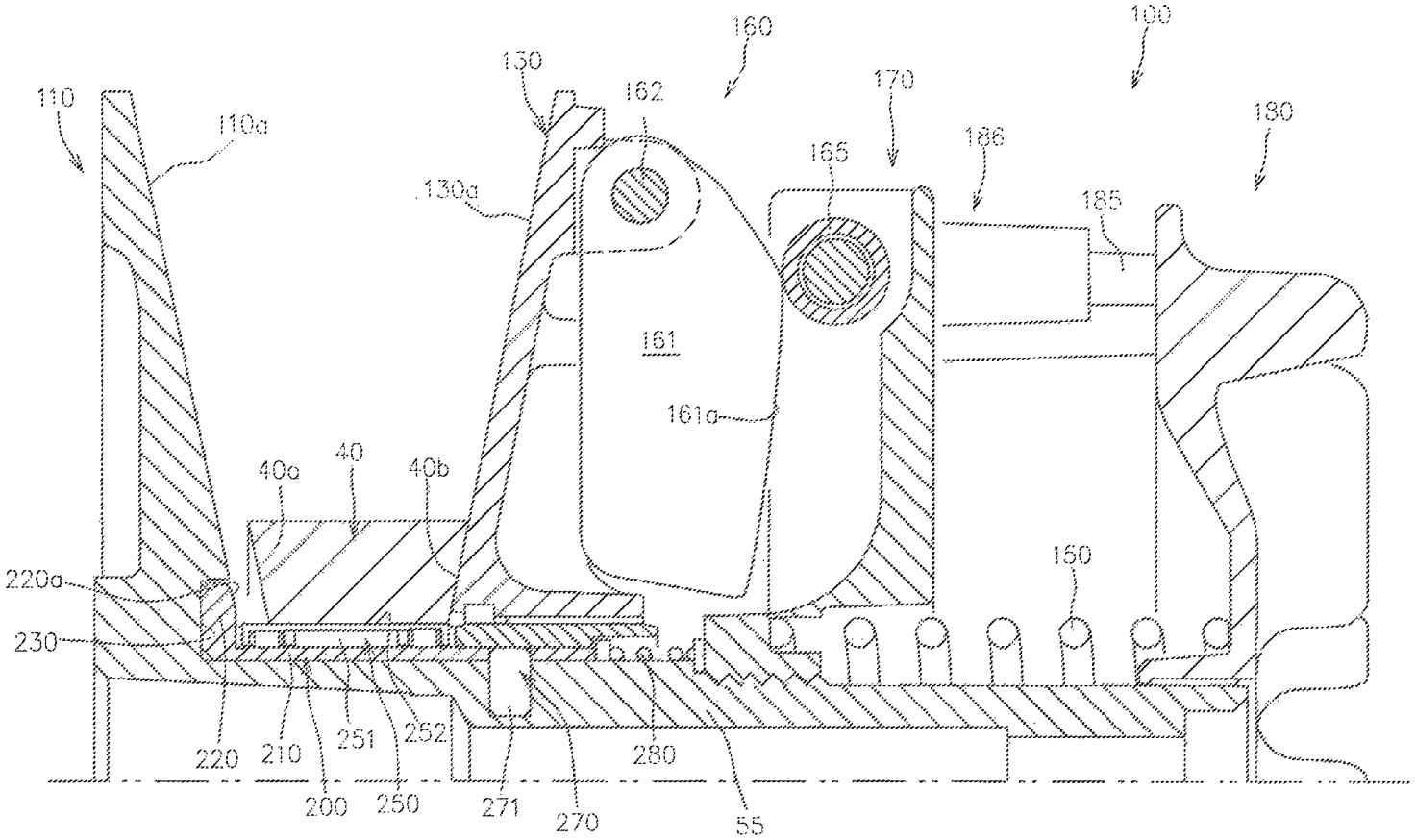
FIG. 5 is a partial vertical cross sectional view of the driving-side pulley according to the first embodiment in a state where a rotational speed of an engine output is an idle rotational speed.

Accordingly, when the engine is in the idle state shown in FIG. 5, the first and second side faces 40a, 40b of the belt 40 are not sandwiched by the driving-side movable sheave 130 and the driving-side fixed sheave 110, whereby the rotational power is not transmitted from both the sheaves 110, 130 to both the side surfaces 40a, 40b of the belt 40.

In this situation, although the belt 40 is moved inward in the radial direction so that the inner circumferential surface of the belt 40 engages with the outer ring body 252 of the one-way clutch 250 that forms the bottom surface of the V-shaped groove, the rotational power is also not transmitted to the inner surface of the belt 40.

More specifically, as explained earlier, the one-way clutch 250 is interposed between the movable sleeve 200 and the inner circumferential surface of the belt 40, the one-way clutch 250 being configured so that the rotational torque of the outer ring body 252 only in the normal direction is transmitted to the [inner ring body 251] *movable sleeve 200* while the rotational torque is not transmitted from the [inner ring body 251] *movable sleeve 200* to the outer ring body 252.

Accordingly, the rotational power is also not transmitted from the driving shaft 55 to the inner circumferential surface of the belt 40, whereby the belt clutch function that effectively prevents the creep phenomenon form occurring when the engine is in the idle state can be realized.

When the rotational speed of the engine output increases from an idle rotational speed to reach a predetermined starting speed in accordance with the operation on the engine output operating member, the power transmission from the driving shaft 55 to the driven shaft 65 is started. After that, the speed of the rotational power that is transmitted to the driven shaft 65 increases as the rotational speed of the engine output increases.

To explain in detail, as the rotational speed of the engine output (that is, the rotational speed of the driving shaft 55) increases, the pressing force with which the flyweight mechanism 160 presses the driving-side movable sheave 130 increases, resulting in increase of the force with which the driving-side movable sheave 130 and the driving-side fixed sheave 110 sandwiches the belt 40.

The flyweight mechanism 160 generates the pressing force having such an amount as to allow the rotational power to be transmitted from the engagement surfaces 110a, 130a to the first and second side surfaces 40a, 40b of the belt 40 at the time when the rotational speed of the engine output reaches the starting speed.

Figure 6:
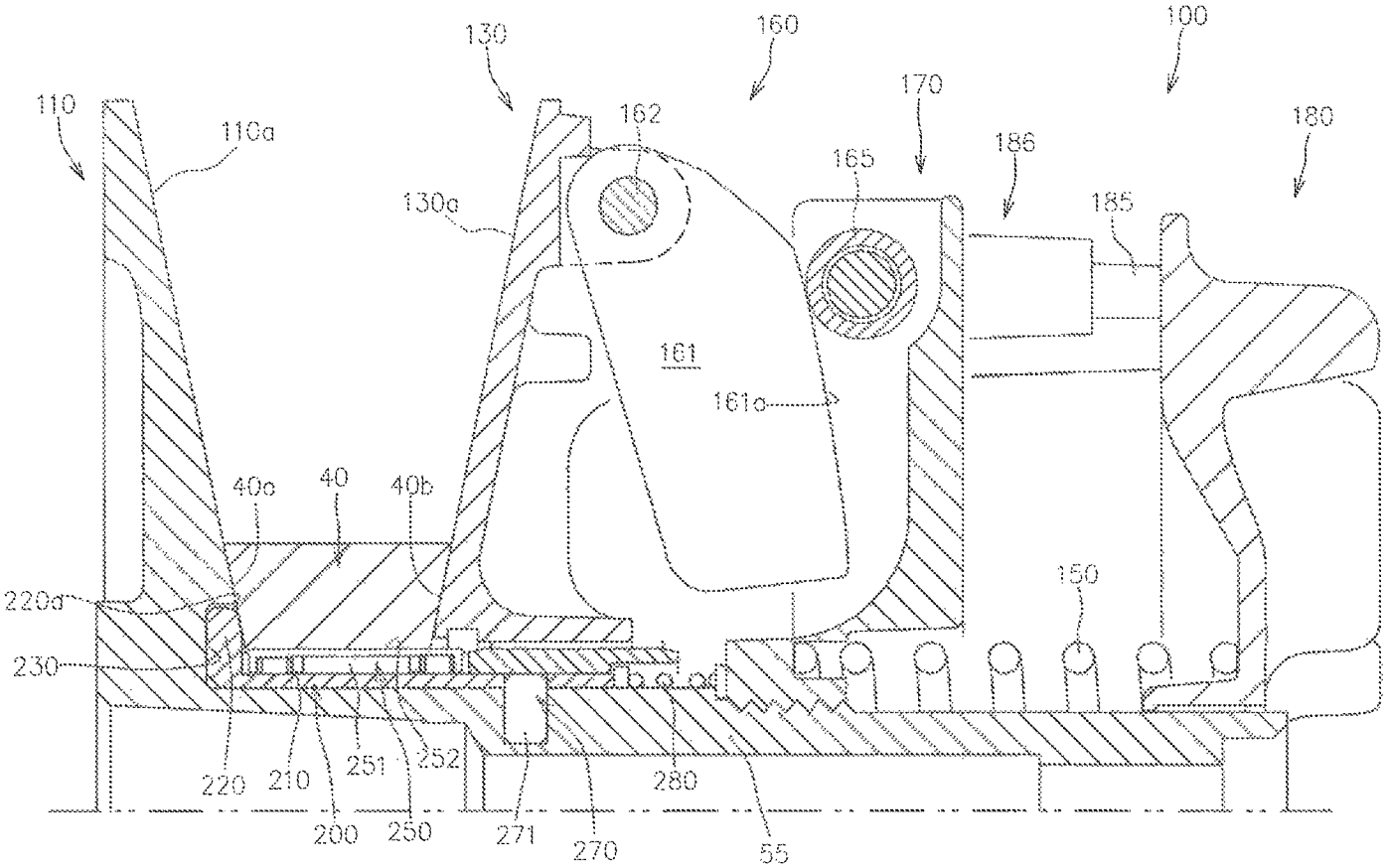
FIG. 6 is a partial vertical cross sectional view of the driving-side pulley according to the first embodiment in a state where the rotational speed of the engine output is a starting speed.

FIG. 6 is a vertical cross sectional view of the driving-side pulley 100 at the time when the rotational speed of the engine output becomes the starting speed.

If the rotational speed of the engine output further increases from the state shown in FIG. 6, the pressing force that the flyweight mechanism 160 generates further increases, whereby the driving-side movable sheave 130 further comes closer to the driving-side fixed sheave 110.

In accordance with this movement of the driving-side movable sheave 130, the belt 40 moves outward in the radial direction along the engagement surfaces 110a, 130a that forms the V-shaped groove.

By the movement of the belt 40, the effective diameter of the driving-side pulley 100 increases and the effective diameter of the driven-side pulley 20 decreases, whereby the speed of the rotational power that is transmitted to the driven shaft 65 increases.

Figure 7:
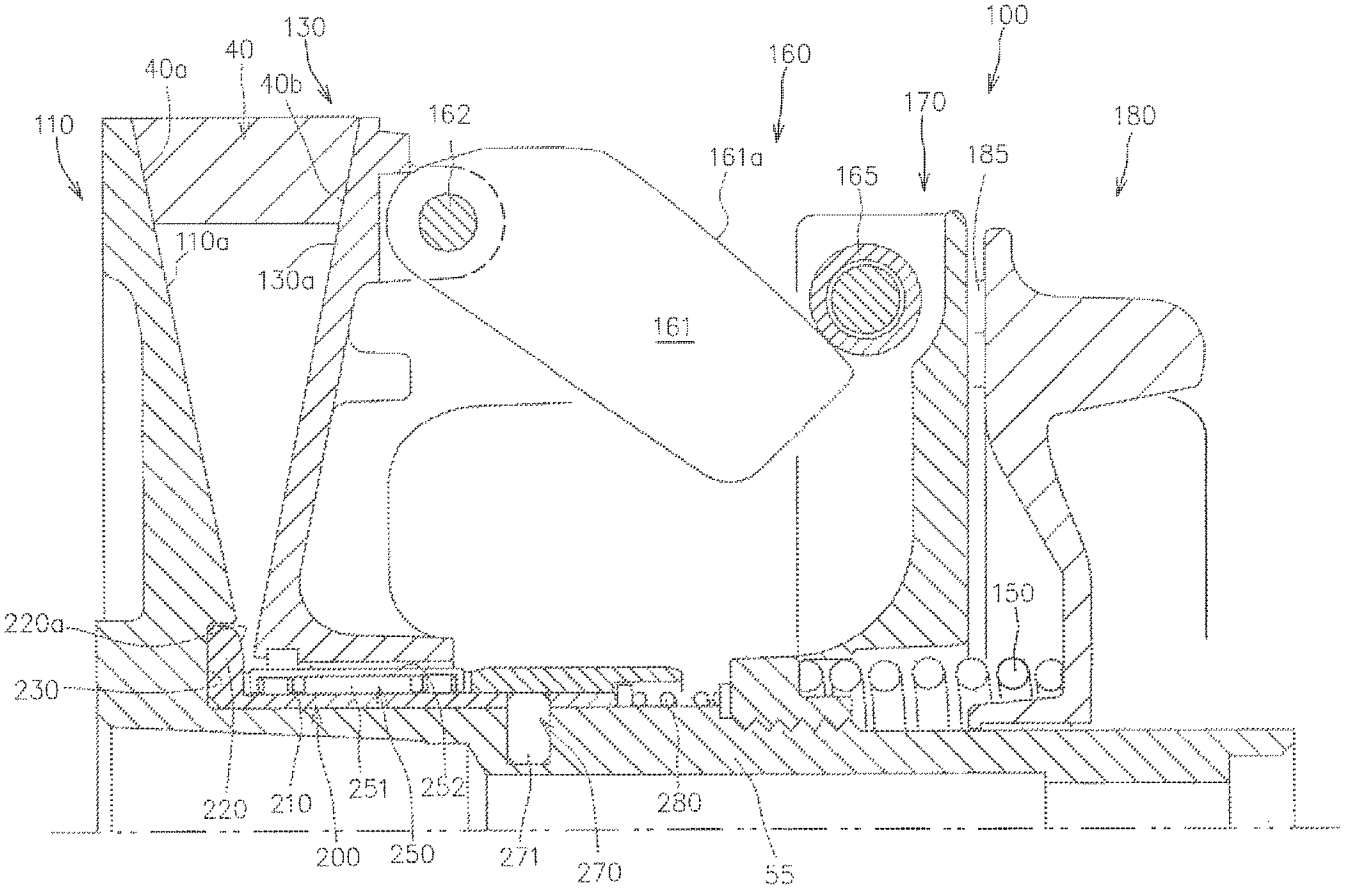
FIG. 7 is a partial vertical cross sectional view of the driving-side pulley according to the first embodiment in a state where the rotational speed of the engine output is a maximum speed.

FIG. 7 is a vertical cross sectional view of the driving-side pulley 100 at the time when the rotational speed of the engine output becomes a maximum speed.

Next, the engine braking function by the driving-side pulley 100 will be explained.

In a case where the power transmission from the driving shaft 55 to the driven shaft 65 is realized so that the vehicle travels by having the rotational speed of the engine output fallen within a vehicle-traveling capable speed range from the starting speed until the maximum speed through the operation on the engine output operating member, there are cases where the engine braking is needed to function depending on the traveling situation such as a case in which the vehicle travels on a downslope.

In such a case, the operator releases the engine output operating member to degree the rotational speed of the driving shaft 55 to a rotational speed (hereinafter, referred to as idle corresponding speed) when the engine is in the idle state. On the other hand, the driven shaft 65 rotates at a speed higher than the driving shaft 55 since the driven shaft 65 receives inertia force operatively transmitted from the driving wheel 60.

If the rotational speed of the driving shaft 55 becomes the idle corresponding speed, the pressing force with which the flyweight mechanism 160 presses the driving side movable sheave 130 decreases, whereby the driving-side movable sheave 130 is moved away from the driving-side fixed sheave 110 by the pressing force of the return spring 150.

By the movement, the belt 40 is moved inward in the radial direction of the driving side pulley 100 so that the inner circumferential surface of the belt 40 engages with the bottom surface of the V-shaped grove, that is, the outer ring body 252 of the one-way clutch 250.

The belt 40 is rotated in the normal direction by the inertia force operatively transmitted from the driving wheel 60. Therefore, if the inner circumferential surface of the belt 40 engages with the outer ring body 252, the rotational power in the normal direction is transmitted from the belt 40 to the outer ring body 252, and it is then transmitted to the [inner ring body] *needle roller* 251.

Since the [inner ring body] *needle roller* 251 is inserted around the tubular portion 210 of the movable sleeve 200 in [a non-rotatable manner with respect to thereto] *such a manner as that the needle roller 251 transmits the rotational power in the normal direction to the tubular portion 210*, the movable sleeve 200 rotates in the normal direction around the axis line with respect to the axis-line-direction fixed member.

The driving-side pulley 100 is provided with the cam mechanism 270 that includes the convex-like member 271 and the spiral groove 275. The convex-like member 271 arranged at one (the axis-line-direction fixed member in the present embodiment) of the axis-line-direction fixed member (the driving shaft 55 in the present embodiment) and the tubular portion 210 of the movable sleeve 200, and the spiral groove 275 arranged at the other one (the tubular portion 210 in the present embodiment) of the axis-line-direction fixed member and the tubular portion 210.

Therefore, if the movable sleeve 200 rotates in the normal direction around the axis line with respect to the axis-line-direction fixed member, the movable sleeve 200 is pressed in the first direction along the axis line by the cam mechanism 270 so that the pressing surface 220a is pressed against the corresponding first side surface 40a.

Figure 8:
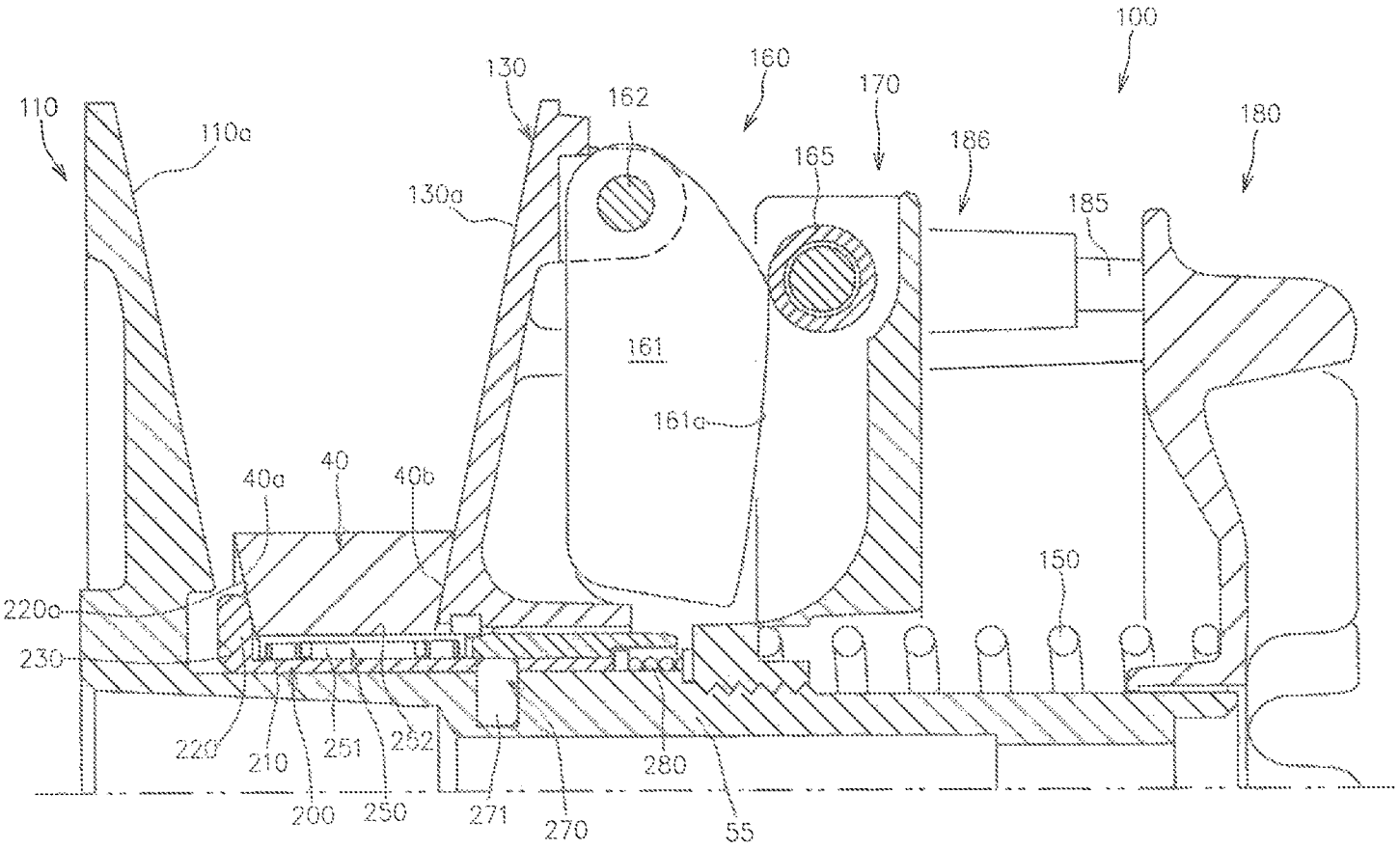
FIG. 8 is a partial vertical cross sectional view of the driving-side pulley according to the first embodiment when an engine braking function activates.

As a result, as shown in FIG. 8, the belt 40 is sandwiched by the pressing surface 220a and the movable sheave-side engagement surface 130a, whereby a sufficient frictional force is realized between the first side surface 40a of the belt 40 and the pressing surface 220a, and also between the second side surface 40b of the belt 40 and the movable sheave-side engagement surface 130a.

Accordingly, the inertial force transmitted from the driven shaft 65 is transmitted to the driving shaft through the movable sleeve 200 having the pressing surface 220a from of the first side surface 40a of the belt 40, and also through the driving-side movable sheave 130 having the movable sheave-side engagement surface 130a from the second side surface 40b of the belt 40, thereby securing the engine braking function having a sufficient capacity.

In the present embodiment, as shown in FIGS. 5 to 8, the driving-side pulley 100 further includes an auxiliary spring 280 pressing the movable sleeve 200 in a second direction along the axis line that is opposite the first direction.

The auxiliary spring 280 is provided for assisting a movement of the movable sleeve 200 to an initial position (a position where the movable sleeve 200 is arranged in FIGS. 5 to 7) at a normal transmitting state in which the rotational power is transmitted from the driving shaft 55 to the driven shaft 65.

Specifically, in a configuration including the cam mechanism 270 that has the convex-like member 271 arranged at one of the axis-line-direction fixed member (the driving shaft 55 in the present embodiment) and the movable sleeve 200, and the spiral groove 275 arranged at the other one of the axis-line-direction fixed member and the movable sleeve 200 in such a manner as that the convex-like member 271 can be engaged into the spiral groove 275 as in the present embodiment, the movable sleeve 200 is pressed in the first direction along the axis line (the direction toward the movable sheave 130) by the cam function of the cam mechanism 270 when the movable sleeve 200 rotates ahead of the driving shaft 55 around the axis line by the inertia force transmitted from the driven shaft 65 through the bolt 40. On the other hand, the movable sleeve 200 is pressed and moved to the initial position in the second direction along the axis line (the direction toward the fixed sheave 110) by the cam function of the cam mechanism 270 in response to the rotation of the driving shaft 55 ahead of movable sleeve 200 around the axis line during the normal transmitting state in which the rotational power is transmitted from the driving shaft 55 to the driven shaft 65 through the belt 40.

Accordingly, the movable sleeve 200 can be theoretically positioned at the initial position without the auxiliary spring 280 in the normal transmitting state in which the rotational power is transmitted from the driving shaft 55 to the driven shaft 65. However, the provision of the auxiliary spring 280 can reliably and quickly move the movable sleeve to the initial position.

Figure 9:
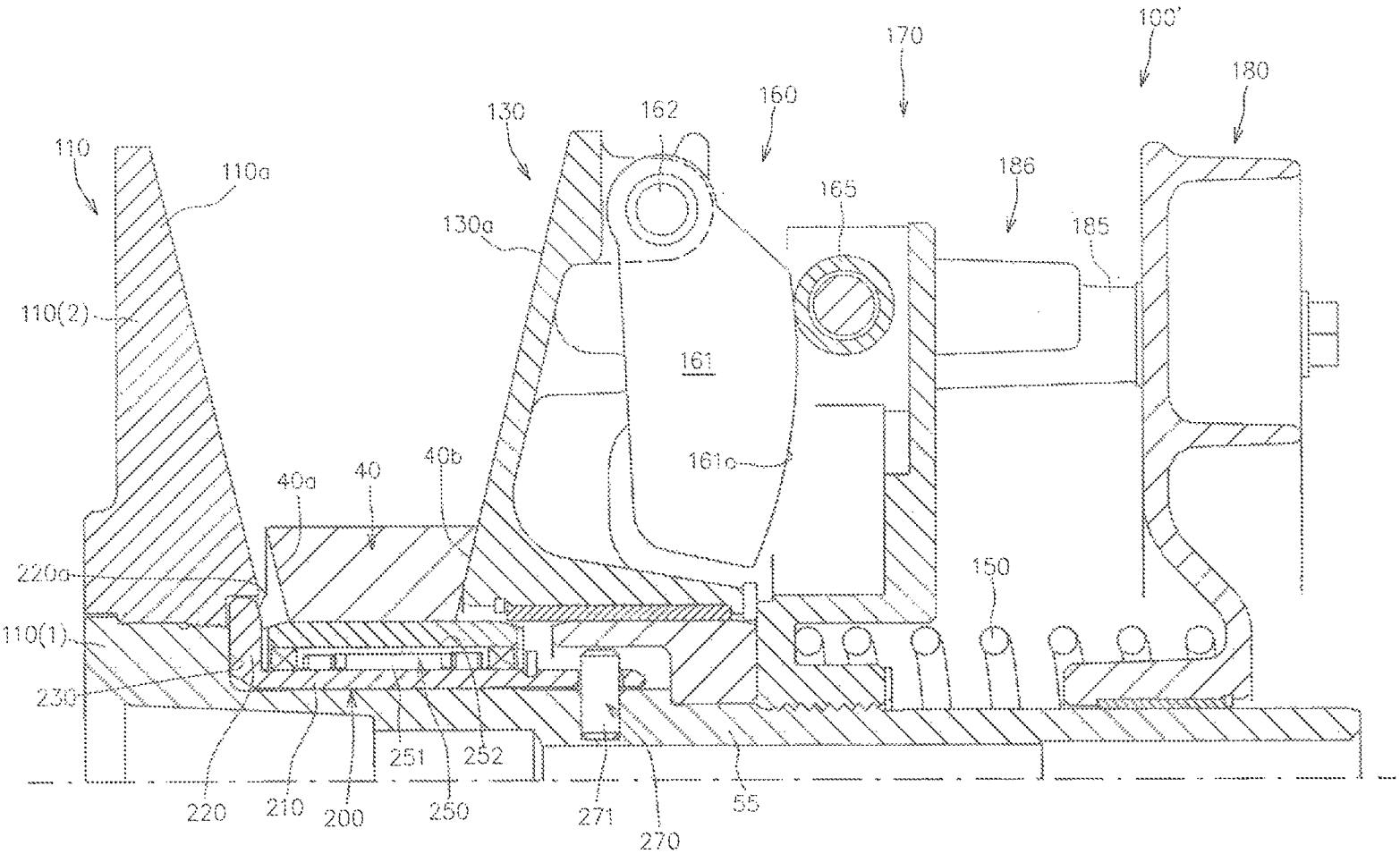
FIG. 9 is a partial vertical cross sectional view of a driving-side pulley according to a modification of the first embodiment.

FIG. 9 is a partial cross sectional view of a driving-side pulley 100' according to a modified example of the present embodiment.

It can be effectively prevented that the presence of the movable sleeve 200 affects a speed change ration of the belt-type continuously variable transmission 10 including the driving-side pulley 100 by having the movable sleeve 200 positioned at the initial position in the normal transmitting state.

The initial position is arranged in such a manner as to cause the pressing surface 220a to be positioned on the same plane as one engagement surface (hereinafter referred to as a reference engagement surface, and the fixed sheave-side engagement surface 110a in the present embodiment) out of the fixed sheave-side engagement surface 110a and the movable sheave-side engagement surface 130a that engages with the side surface (the first side surface 40a in the present embodiment) of the belt 40 against which the pressing surface 220a is pressed.

To explain in detail, as shown in FIGS. 5 to 8, the sheave (the driving-side fixed sheave 110 in the present embodiment) that has the reference engagement surface is provided with a concave portion 230 that is arranged inward of the reference engagement surface (the fixed sheave-side engagement surface 110a in the present embodiment) in the radial direction and into which the flange portion 220 of the movable sleeve 200 can be engaged.

As explained earlier, the movable sheave 130 is farther moved by the flyweight mechanism 160 in the second direction along the axis line toward the fixed sheave 110 as the rotational speed of the engine output increases. At the time, the movable sleeve 200 is moved in the second direction along the axis line by the movable sheave 130 through the belt 40 while receiving the assist formed by the pressing force in the second direction along the axis line that the cam mechanism 270 generates in response to the movement of the driving shaft 55 ahead of the movable sleeve 200 and the pressing force in the second direction along the axis line that the auxiliary spring 280 generates, so that the movable sleeve 200 is positioned at the initial position in which the flange portion 220 is engaged into the concave portion 230. In a state in which the movable sleeve 200 is positioned at the initial position, the pressing surface 220a is arranged on the same plane as the reference engagement surface (the fixed sheave-side engagement surface 110a in the present embodiment).

The configuration makes it possible that the pressing surface 220a of the movable sleeve 200 functions as an inertia force transmitting surface for frictionally transmitting the inertia force from the corresponding side surface (the first side surface 40a in the present embodiment) of the belt 40 to the movable sleeve 200 at the engine braking operating time, and also functions as a power transmitting surface for frictionally transmitting the driving power from the driving shaft 55 to the corresponding side surface (the first side surface 40a in the present embodiment) in cooperation with the reference engagement surface at the normal power transmitting time when the power is transmitted from the driving shaft 55 to the driven shaft 65.

In the present embodiment, as shown in FIGS. 5 to 8, the return spring is arranged between the spider 170 and the base member 180, while the auxiliary spring 280 is arranged inward of the flyweight 161 in the radial direction and between the spider 170 and an end portion of the tubular portion 210 that is on a side opposite the flange portion 220 in the axis line direction.

The configuration can downsize the driving-side pulley 100 including the movable sleeve 200, the one-way clutch 250 and the auxiliary spring 280.

In the modified example 100' shown in FIG. 9, the driving-side fixed sheave 110 includes a base portion 110(1) supported by the driving shaft 55 and a conical portion 110(2) provided with the fixed sheave-side engagement surface 110a, wherein the base portion 110(1) and the conical portion 110(2) are separate from each other.

The conical portion 110(2) is detachably connected to the base portion 110(1) via knurling screw connection, for example.

In a configuration shown in FIG. 9, the base portion 110(1) is integrally formed with the driving shaft 55.

The configuration makes it possible to make materials of the base portion 110(1) and the conical portion 110(2) different from each other. For example, the base portion 110(1) may be made of iron while the conical portion 110(2) may be made of aluminum. The configuration can realize reduction in manufacturing cost and processing cost of the component.

In the modified example, as shown in FIG. 9, the concave portion 230 into which the flange portion 220 is engaged when the movable sleeve 200 is positioned at the initial position is formed so as to be across a boundary between the base portion 110(1) and the conical portion 110(2).

Second Embodiment

Hereinafter, another embodiment of the driving-side pulley according to the present invention will be explained, with reference to the attached drawings.

Figure 10:
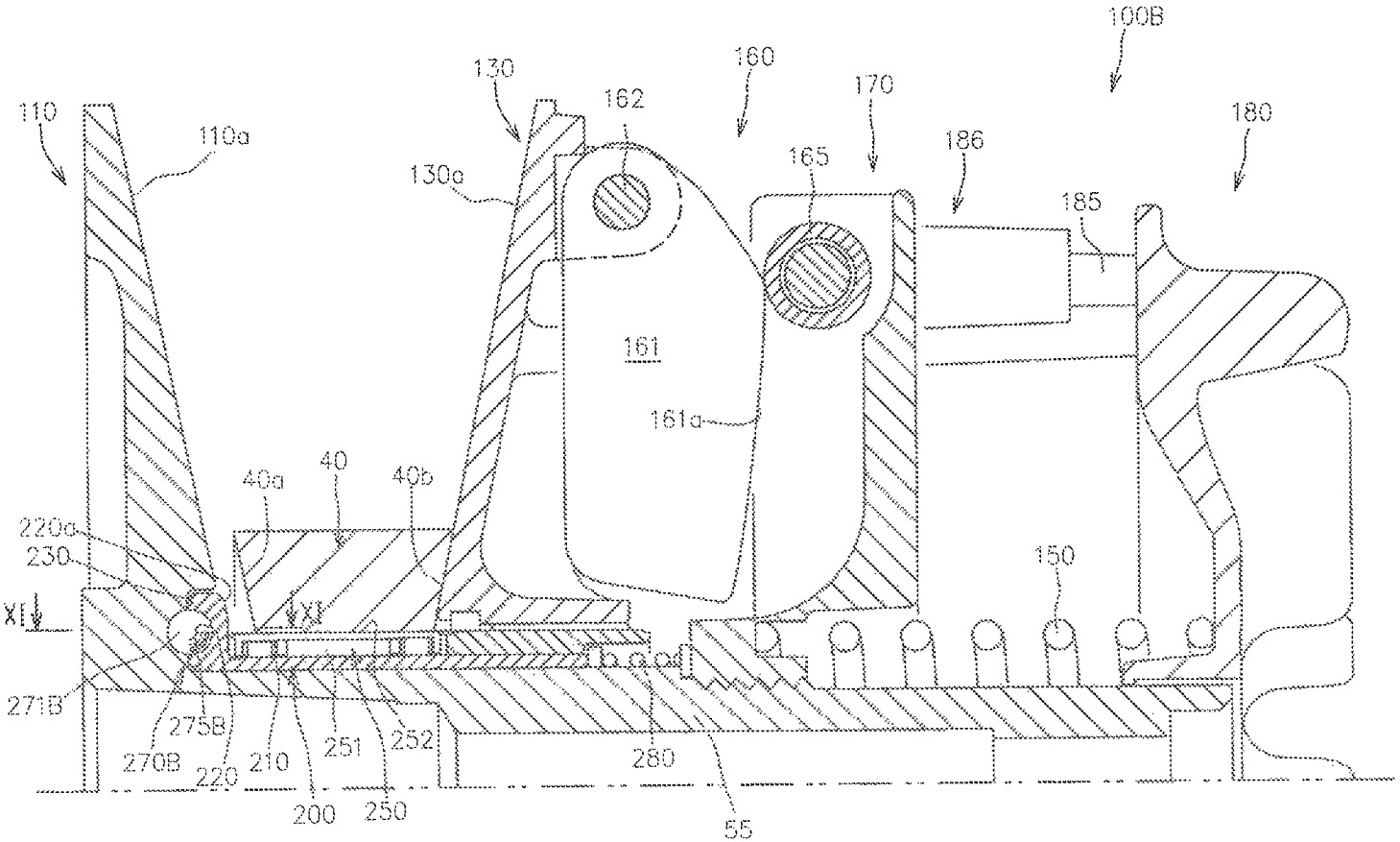
FIG. 10 is a partial vertical cross sectional view of a driving-side pulley according to a second embodiment of the present invention.

FIG. 10 is a partial vertical cross sectional view of the driving-side pulley 100B according to the present embodiment when the engine is in the idle state.

Figure 11:
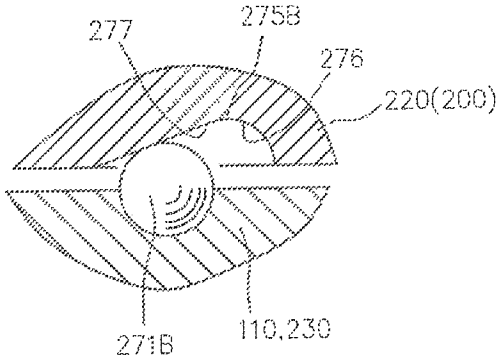
FIG. 11 is a cross sectional view taken along line XI-XI in FIG. 10.

FIG. 11 is a partial cross sectional view taken along the line XI-XI in FIG. 10.

Figure 12:
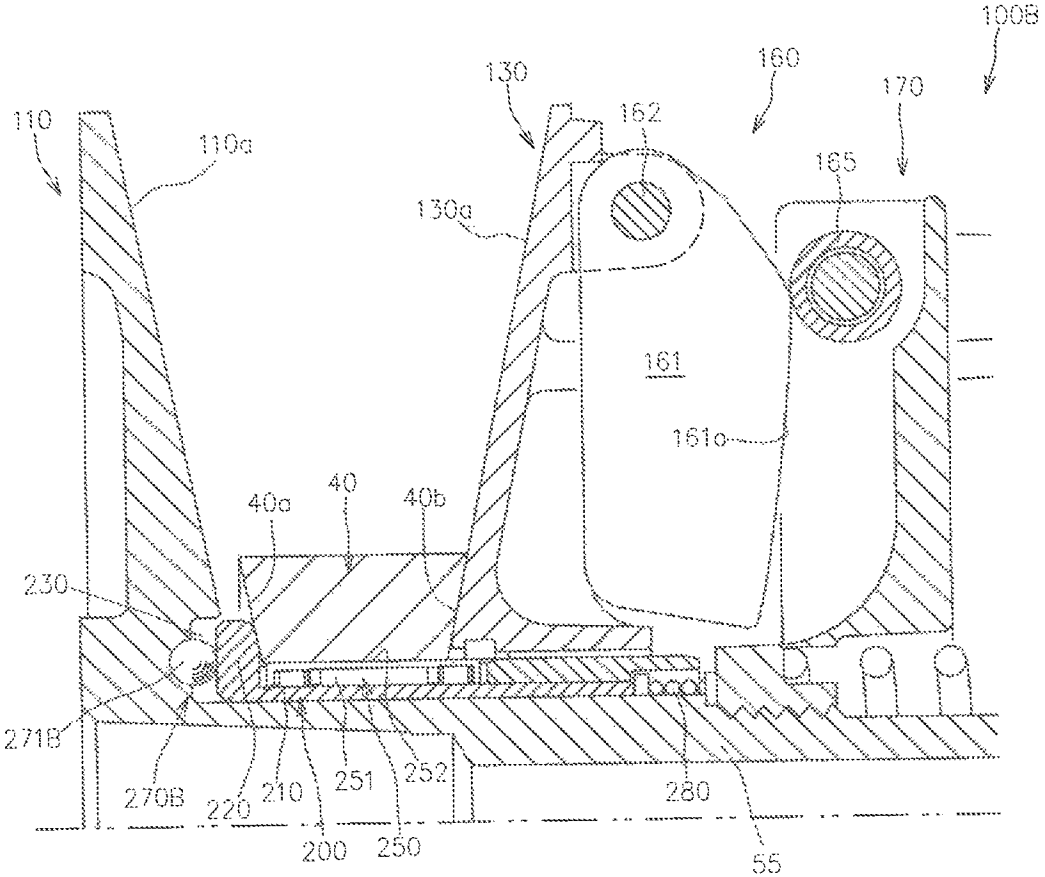
FIG. 12 is a partial vertical cross sectional view of the driving-side pulley according to the second embodiment when the engine braking function activates.

FIG. 12 is a partial vertical cross sectional view of the driving-side pulley 100B when the engine braking function is activated.

In the drawings, the same reference numerals are denoted for the same components as those in the first embodiment to omit the detailed explanation thereof.

The driving-side pulley 100B according to the present embodiment is different from the driving-side pulley 100 according to the first embodiment substantially only in that the cam mechanism 270 is replaced by a cam mechanism 270B.

As shown in FIGS. 10 and 12, one sheave (the fixed sheave 110 in the present embodiment) that has the reference engagement surface is provided with the concave portion 230 that is arranged inward of the reference engagement surface in the radial direction and into which the flange portion 220 of the movable sleeve 200 can be engaged.

In a normal state in which the pressing force in the first direction along the axis line is not applied to the movable sleeve 200 through the cam mechanism 270B, the movable sleeve 200 is pressed by the auxiliary spring 280 toward the initial position in which the flange portion 220 is engaged into the concave portion 230.

The cam mechanism 270B includes an engagement groove 275B and a convex-like portion 271B. The engagement groove 275B is provided at one of a rear surface of the flange portion 220 and a bottom surface of the concave portion 230, the rear surface being positioned on a side opposite the pressing surface. The convex-like portion 271B is provided at the other one of the rear surface of the flange portion 220 and the bottom surface of the concave portion 230.

In the present embodiment, as shown in FIGS. 10 to 12, the engagement groove 275B is provided at the rear surface while the convex-like portion 271B is provided at the bottom surface.

As shown in FIG. 11, the engagement groove 275B includes a deepest area 276 and an inclined area 277 extending from the deepest area in one direction in a circumferential direction.

Specifically, the deepest area 276 is arranged so that the convex-like portion 271B engages with the deepest area 276 when the movable sleeve 200 is positioned at the initial position.

The inclined area 277 is arranged so that the convex-like portion 271B engages with the inclined area 277 when the movable sleeve 200 rotates in the normal direction around the axis line with respect to the axis-line-direction fixed member from a state in which the convex-like portion 271B engages with the deepest area 276, and is inclined in such a manner as that an engagement point at which the convex-like portion 271B engages with the inclined area 277 becomes narrower as the movable sleeve 200 rotates in the normal direction around the axis line with respect to the axis-line-direction fixed member.

As with the first embodiment, the thus configured driving-side pulley 100B can effectively prevent the creep phenomenon from occurring when the engine is in the idle state and also can realize the engine braking function with a sufficient brake capacity when the engine output operating member is released during the traveling of the vehicle.

More specifically, as explained in the first embodiment, the first and second side surfaces 40a, 40b of the belt 40 are not sandwiched by the driving-side movable sheave 130 and the driving-side fixed sheave 110 due to a power relationship between the flyweight mechanism 160 and the return spring 150 when the engine is in the idle state. As a result, the power is not transmitted from both the sheaves 110, 130 to both the side surfaces 40a, 40b of the belt 40. Also, the power is not transmitted from the inner circumferential surface of the belt 40 to the movable sleeve 200 due to the presence of the one-way clutch 250 (see FIG. 10).

On the other hand, when the engine output operating member is released during the traveling of the vehicle so that the rotational speed of the driving shaft 55 becomes lower than that of the driven shaft 65, the inertia force is transmitted from the driven shaft 65 to the movable sleeve 200 through the belt 40 and the one-way clutch 250 so that the movable sleeve 200 rotates in the normal direction around the axis line with respect to the axis-line-direction fixed member (the driving shaft 55 in the present embodiment).

When the movable sleeve 200 starts to rotate with respect to the axis-line-direction fixed member, the engagement point at which the convex-like portion 271B engages with the engagement groove 275B shifts from the deepest area 276 to the inclined area 277.

As a rotational angle of the movable sleeve 200 with respect to the axis-line-direction fixed member becomes larger, the convex-like portion 271B engages with a farther narrow portion of the inclined area 277, whereby the movable sleeve is pressed in the first direction along the axis line.

Therefore, the belt 40 is sandwiched by the pressing surface 220 and the movable sheave-side engagement surface 130a, the inertial force that has been transmitted from the driven shaft 65 to the belt 40 is transmitted to the driving shaft 55 from the first side surface 40a of the belt 40 through the movable sleeve 200 and is also transmitted to the driving shaft 55 from the second side surface 40b of the belt 40 through the driving-side movable sheave 130, whereby the engine braking function with a sufficient brake capacity is secured.

The convex-like portion 271B may be preferably formed by a rolling member such as a ball.

The preferable configuration makes it possible to reduce a frictional resistance between the convex-like member 271B and the engagement groove 275B, thereby activating the engine braking with good responsiveness.

Although the first and second embodiments each are configured so that the pressing surface 220a of the movable sleeve 200 engages with the first side surface 40a of the belt 40, the present invention is not limited to the configuration.

That is, the movable sleeve 200 can be modified so that the pressing surface 220a engages with the second side surface 40h of the belt 40.

In the modified example, the flange portion 220 extends outward in the radial direction from an end of the tubular portion 210 that is positioned on a side close to the movable sheave 130.

In this case, when the engine braking function activates, the belt 40 is sandwiched by the pressing surface 220a of the movable sleeve 200 and the fixed sheave-side engagement surface 110a.

Also, in this case, the concave portion 230 in which the flange portion 220 is engaged is provided with the movable sheave 130 rather than the fixed sheave 110.

Specifically, the concave portion 230 is arranged inward of the movable sheave side engagement surface 130a in the radial direction so that the flange portion 220 of the movable sleeve 200 can be engaged into the concave portion 230.

A driving-side pulley 100C according to a first reference example will now be explained.

Figure 13:
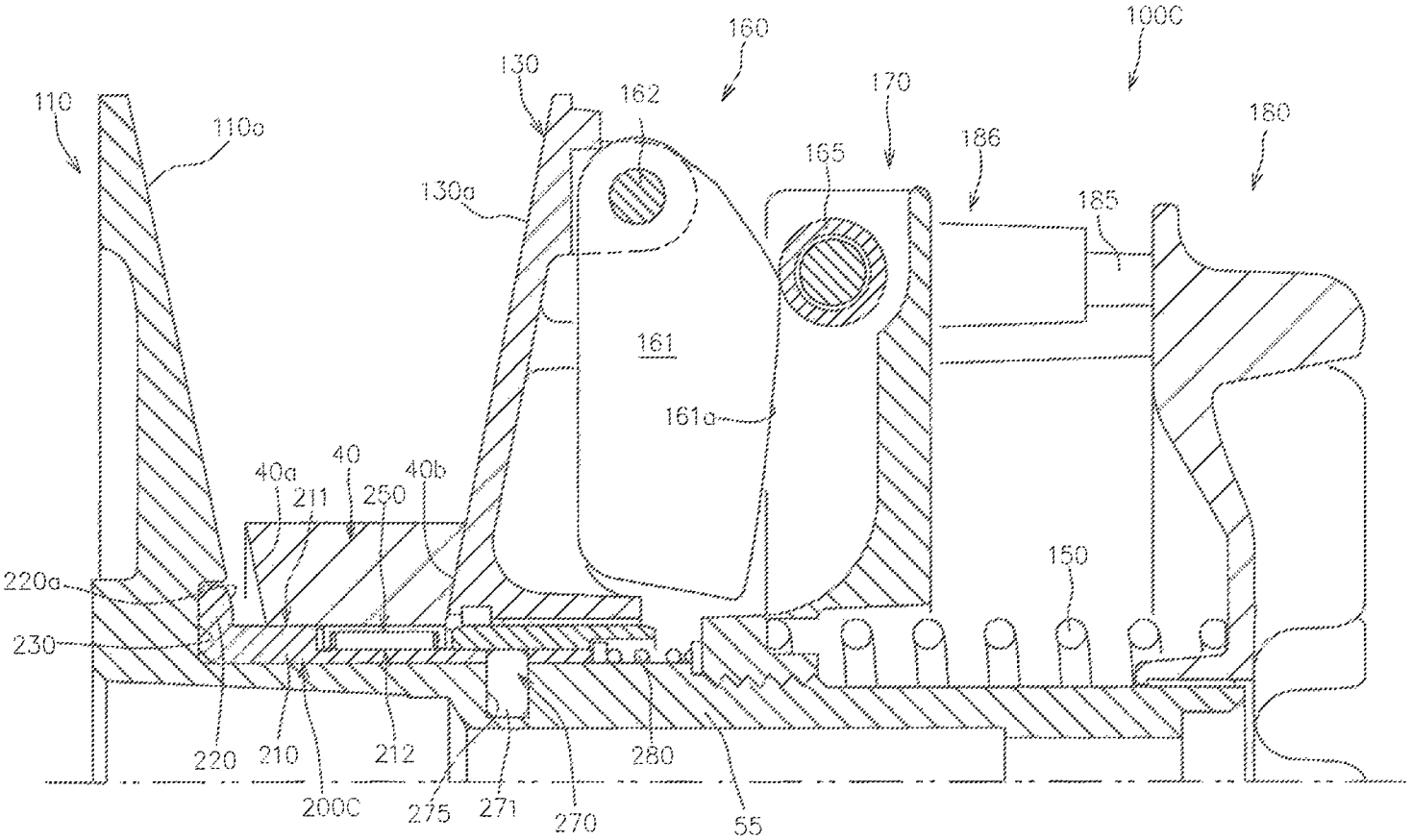
FIG. 13 is a vertical cross sectional view of a driving-side pulley according to a first reference example.

FIG. 13 is a vertical cross sectional view of the driving-side pulley 100C.

In FIG. 13, the same reference numerals are denoted for the same components or parts as those in the first and second embodiments.

The driving-side pulley 100C according to the first reference example includes a movable sleeve 200C in place of the movable sleeve 200 and does not include the one-way clutch 250, in comparison with the driving-side pulley 100 according to the first embodiment.

To explain in detail, as shown in FIG. 13, the driving-side pulley 100C includes the fixed sheave 110, the movable sheave 130, the return spring 150 and the flyweight mechanism 160, and further includes the movable sleeve 200C inserted around the axis-line-direction fixed member in a movable manner along the axis line and in a rotatable manner around the axis line with respect thereto, the axis-line-direction fixed member being formed by the driving shaft 55 or the fixed sheave 110.

The movable sleeve 200C is in common with the movable sleeve 200 in that it includes the tubular portion 210 inserted around the axis-line-direction fixed member in such a manner as to its outer circumferential surface forms the bottom surface of the V-shaped groove and a flange portion 220 extending outward in the radial direction from the end portion of the tubular portion 210 that is positioned on a side close to the fixed sheave 110, and also in that the flange portion 220 is provided with the pressing surface 220a capable of engaging with the first side surface 40a of the belt 40 when the inner circumferential surface of the belt 40 engages with the outer circumferential surface of the tubular portion 210.

The driving-side pulley 100C is also provided with the can mechanism 270. The cam mechanism 270 presses the movable sleeve 200 toward the movable sheave 200C in accordance with the rotation of the movable sleeve 200C around the axis line in the normal direction with respect to the axis-line-direction fixed member.

The driving side pulley 100C also can effectively prevent the creep phenomenon form occurring when the engine is in the idle state and realize the engine braking function with a sufficient capacity.

In the driving-side pulley 100C shown in FIG. 13, the outer circumferential surface of the tubular portion 210 of the movable sleeve 200C includes a frictional contact area 211 that directly engages with the inner circumferential surface of the belt 40 and a bearing area that engages with the inner circumferential surface of the belt 40 via a bearing member 250.

Next, a driving-side pulley 100D according to a second reference example will be explained.

Figure 14:
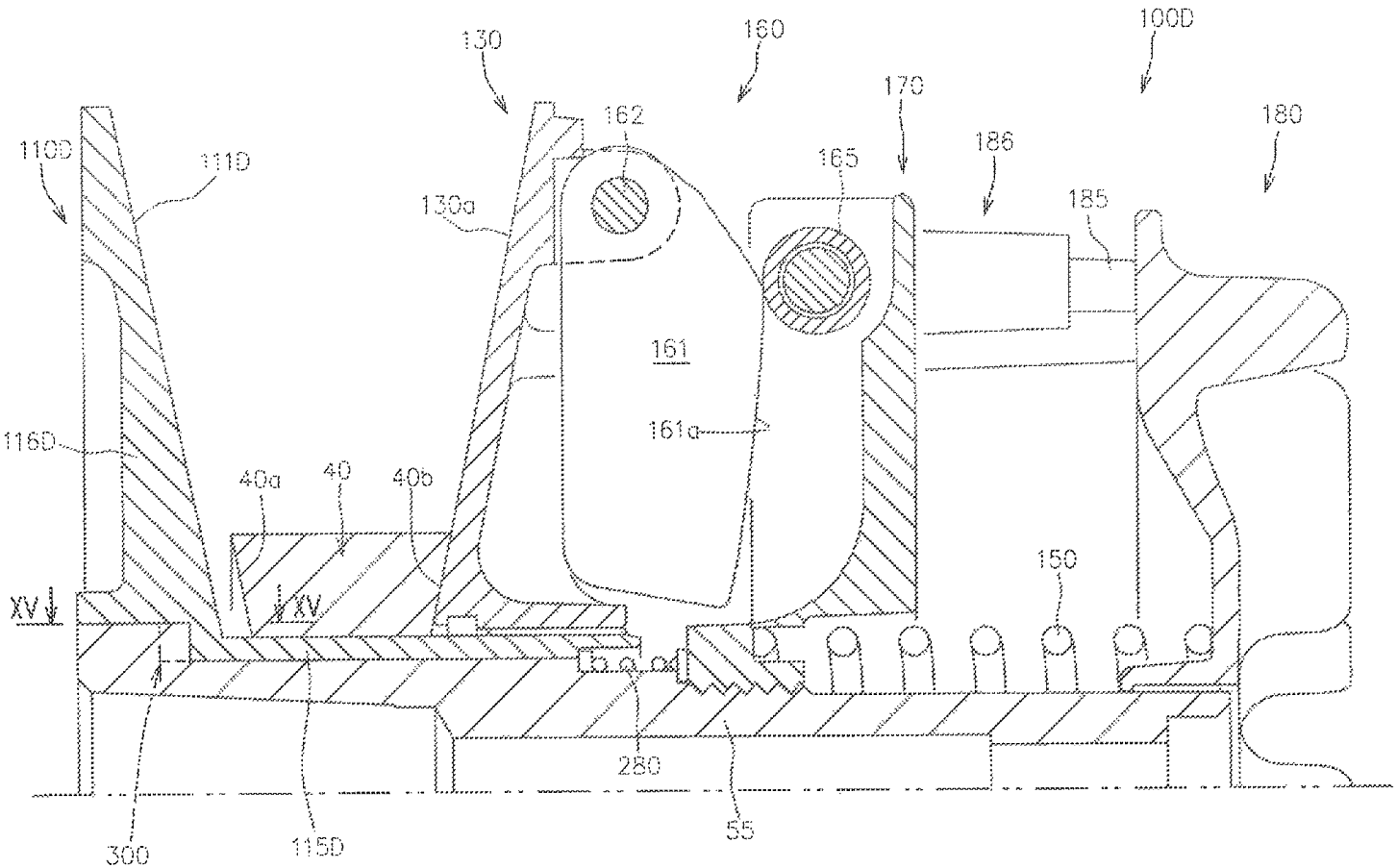
FIG. 14 is a vertical cross sectional view of a driving-side pulley according to a second reference example.

FIG. 14 is a vertical cross sectional view of the driving-side pulley 100C.

In FIG. 14, the same reference numerals are denoted for the same components or parts as those in the first and second embodiments and the first reference example.

As shown in FIG. 14, the driving-side pulley 100D includes a reference sheave 110D movable in the axis line and rotatable around the axis line with respect to the driving shaft 55, the movable sheave 130, the return spring 150 and the flyweight mechanism 160, wherein the reference sheave 110D is provided with a reference-sheave-side engagement surface 111D capable of engaging with the first side surface 40a of the belt 40, and wherein the movable sheave 130 is provided with the movable sheave side engagement surface 130a that is capable of engaging with the second side surface 40b of the belt 40 and forms the V-shaped groove, in which the belt 40 is engaged, in cooperation with the reference-sheave-side engagement surface 111D.

The reference sheave 110D includes a tubular portion 115D inserted around the driving shaft 55 in a movable manner along the axis line and a rotatable manner around the axis line with respect thereto and a radially-extending portion 116D extending outward in the radial direction from an end portion of the tubular portion 115D that is positioned on a side opposite the movable sheave 130 and including the reference-sheave-side engagement surface 111D formed therein.

As shown in FIG. 14, the movable sheave 130 is inserted around the tubular portion 115D so that a part of the outer circumferential surface of the tubular portion 115D forms the bottom surface of the V-shaped groove.

Figure 15B:
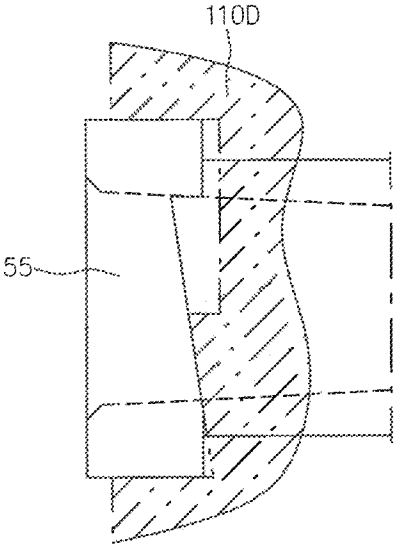

FIGS. 15A and 15B are cross sectional views taken along the line XV-XV in FIG. 14.

FIG. 15A shows a state in which there is no difference in a relative rotation between the reference sheave 110D and the driving shaft 55, and FIG. 15B shows a state in which the reference sheave 110D rotates around the axial line in a normal direction relative to the driving shaft 55.

As shown in FIGS. 14, 15A and 15B, the driving-side pulley 100D includes a cam mechanism 300. The cam mechanism 300 is configured so as to rotate the reference sheave 110D around the axis line in the normal direction in accordance with the rotation of the driving shaft 55 around the axis line in the normal direction while allowing the reference sheave 110D to rotate around the axis line in the normal direction with respect to driving shaft 55, and is also configured so as to press the movable sheave 130 toward the reference sheave 110D by utilizing a relative rotation of the reference sheave 110D around the axis line with respect to the driving shaft 55.

The driving-side pulley 100D also can effectively prevent the creep phenomenon form occurring when the engine is in the idle state and realize the engine braking function with a sufficient capacity.

The invention claimed is:

1. A driving-side pulley forming one component of a belt-type continuously variable transmission that transmits a rotational power from a driving shaft to a driven shaft while continuously changing a speed of the rotational power that is transmitted to the driven shaft in accordance with a rotational speed of the driving shaft, the driving-side pulley comprising:

a fixed sheave immovable along an axis line and non-rotatable around the axis line with respect to the driving [shafts] *shaft*;

a movable sheave movable along the axis line and non-rotatable around the axis line with respect to the driving shaft;

a return spring pressing the movable sheave in a direction away from the fixed sheave; and a flyweight mechanism pressing the movable sheave in a direction toward the fixed sheave with a force having an amount corresponding to the rotational speed of the driving shaft against a pressing force of the return spring, wherein the fixed sheave is provided with a fixed sheave-side engagement surface capable of engaging with a first side surface of a belt while the movable sheave is provided with a movable sheave-side engagement surface that is capable of engaging with a second side surface of the belt and forms, in cooperation with the fixed sheave-side engagement surface, a V-shaped groove into which the belt is engaged, wherein the driving-side pulley includes a movable sleeve inserted around an axis-line-direction fixed member, which is formed by the driving shaft or the fixed sheave, in a movable manner along the axis line and in a rotatable manner around the axis line with respect thereto, and a one-way clutch inserted around the movable sleeve in such a manner as to form a bottom surface of the V-shaped groove, wherein the movable sleeve includes a tubular portion inserted around the axis-line-direction fixed member and a flange portion extending outward in a radial direction from the tubular portion, wherein the one-way clutch includes an [inner] *outer* ring body inserted around the tubular portion [in a non-rotatable manner with respect thereto and an outer ring body surrounding the inner ring body] and forming the bottom surface of the V-shaped groove, and is configured so that only a rotational power generated by a rotation of the outer ring body in a normal direction is transmitted to the [inner ring body] *tubular portion*, wherein the flange portion is provided with a pressing surface capable of engaging with one of the first and second side surfaces of the belt in a state where the inner circumferential surface of the belt engages with the outer ring body, wherein the driving-side pulley further includes a cam mechanism that presses the movable sleeve in a first direction by utilizing a relative rotation of the movable sleeve in the normal direction with respect to the axis-line-direction fixed member, the first direction being a direction that has the pressing surface pressed against a corresponding side surface of the belt, and wherein the cam mechanism includes a convex-like member provided at one of the axis-line-direction fixed member and the [tubular portion] *movable sleeve* so as to be arranged at a position different from the one-way clutch in the axial line direction, and a [spiral] groove provided at the other one of the axis-line-direction fixed member and the [tubular portion] *movable sleeve* in such a manner as that the convex-like member can be engaged into the [spiral] groove.

2. A driving-side pulley according to claim 1 further comprising an auxiliary spring that presses the movable sleeve in a second direction along the axis line that is opposite the first direction.

3. A driving-side pulley according to claim 1, wherein the flange portion of the movable sleeve extends outward in a radial direction from an end portion of the tubular portion that is positioned on a side close to the fixed sheave and is configured so that the pressing surface is capable of engaging with the first side surface of the belt, wherein the fixed sheave is provided with a concave portion that is arranged inward of the fixed sheave-side engagement surface in the radial direction and into which the flange portion of the movable sleeve can be engaged, wherein when the movable sheave is pressed in a direction toward the fixed sheave by the flyweight mechanism that generates a force having an amount corresponding to the rotational speed of the driving shaft, the movable sleeve is moved via the belt by the movable sheave in a second direction opposite the first direction in the axis line to an initial position in which the flange portion is engaged into the concave portion, and wherein the pressing surface is positioned on the same plane as the fixed sheave-side engagement surface when the movable sleeve is positioned at the initial position.

4. A driving-side pulley according to claim 2, wherein the flange portion of the movable sleeve extends outward in a radial direction from an end portion of the tubular portion that is positioned on a side close to the fixed sheave and is configured so that the pressing surface is capable of engaging with the first side surface of the belt, wherein the fixed sheave is provided with a concave portion that is arranged inward of the fixed sheave-side engagement surface in the radial direction and into which the flange portion of the movable sleeve can be engaged, wherein when the movable sheave is pressed in a direction toward the fixed sheave by the flyweight mechanism that generates a force having an amount corresponding to the rotational speed of the driving shaft, the movable sleeve is moved via the belt by the movable sheave in a second direction opposite the first direction in the axis line to an initial position in which the flange portion is engaged into the concave portion, and wherein the pressing surface is positioned on the same plane as the fixed sheave-side engagement surface when the movable sleeve is positioned at the initial position.

5. A driving-side pulley according to claim 3, wherein the fixed sheave-side engagement surface and the pressing surface are arranged with respect to the radial direction in such a manner that both the surfaces engage with the first side surface of the belt when the inner circumferential surface of the belt engages with the outer ring body while the movable sleeve is positioned at the initial position.

6. A driving-side pulley according to claim 4, wherein the fixed sheave-side engagement surface and the pressing surface are arranged with respect to the radial direction in such a manner that both the surfaces engage with the first side surface of the belt when the inner circumferential surface of the belt engages with the outer ring body while the movable sleeve is positioned at the initial position.

7. A driving-side pulley according to claim 2 further comprising: a spider that is arranged on a side opposite the fixed sheave across the movable sheave and is immovable along the axis line and non-rotatable around the axis line with respect to the driving shaft; and a base member that is arranged on a side opposite the movable sheave across the spider and is connected to the movable sheave via a connecting member, wherein the flyweight mechanism includes a flyweight that is arranged between the movable sheave and the spider and swings outward in a radial direction of the driving shaft in accordance with the rotational speed of the driving shaft, wherein the return spring is arranged between the spider and the base member, and wherein the auxiliary spring is arranged inward of the flyweight with respect to the radial direction while being arranged between the spider and an end portion of the tubular portion that is on a side opposite the flange portion with respect to the axis line direction.

8. A driving-side pulley according to claim 2, wherein one of the fixed sheave [and the movable sheave that engages with the side surface of the belt facing the pressing surface] is formed with a concave portion [that is arranged inward of the engagement surface of the one sheave in the radial direction and] into which the flange portion of the movable sleeve can be engaged, wherein the movable sleeve is pressed by the auxiliary spring toward the initial position in which the flange portion is engaged into the concave portion at a normal state in which the cam mechanism does not apply the pressing force in the first direction along the axis line to the movable sleeve, wherein *the position different from the one-way clutch in the axial line direction where* the cam mechanism [includes an engagement groove provided at one of] *is arranged is between* a rear surface of the flange portion that is opposite the pressing surface and a bottom surface of the concave portion, [and a convex-like portion provided at the other one of the rear surface and the bottom surface in such a manner as to be engaged into the engagement groove,]

wherein the [engagement] groove *of the cam mechanism* includes a deepest area with which the convex-like [portion] *member* engages when the movable sleeve is positioned at the initial position, and an inclined area with which the convex-like [portion] *member* engages when the movable sleeve rotates in a normal direction around the axis line with respect to the axis-line-direction fixed member from a state where the convex-like [portion] *member* engages with the deepest area, and wherein the inclined area is inclined in such a manner as that an engagement point at which the convex-like [portion] *member* engages with the inclined area becomes narrower *in the axial line direction* as the movable sleeve farther rotates in the normal direction around the axis line with respect to the axis-line-direction fixed member.

*9. A driving-side pulley according to claim 8, wherein the groove of the cam mechanism is provided at the rear surface of the flange portion while the convex-like member is formed by a ball retained at the bottom surface of the concave portion in such a manner that the ball can be engaged into the groove of the cam mechanism.*

*10. A driving-side pulley forming one component of a belt-type continuously variable transmission that transmits a rotational power from a driving shaft to a driven shaft while continuously changing a speed of the rotational power that is transmitted to the driven shaft in accordance with a rotational speed of the driving shaft, the driving-side pulley comprising:*

*a fixed sheave immovable along an axis line and non-rotatable around the axis line with respect to the driving shaft;*

*a movable sheave movable along the axis line and non-rotatable around the axis line with respect to the driving shaft;*

*a return spring pressing the movable sheave in a direction away from the fixed sheave; and*

*a flyweight mechanism pressing the movable sheave in a direction toward the fixed sheave with a force having an amount corresponding to the rotational speed of the driving shaft against a pressing force of the return spring,*

*wherein the fixed sheave is provided with a fixed sheave-side engagement surface capable of engaging with a first side surface of a belt while the movable sheave is provided with a movable sheave-side engagement surface that is capable of engaging with a second side surface of the belt and forms, in cooperation with the fixed sheave-side engagement surface, a V-shaped groove into which the belt is engaged,*

*wherein the driving-side pulley includes a movable sleeve inserted around an axis-line-direction fixed member, which is formed by the driving shaft or the fixed sheave, in a movable manner along the axis line and in a rotatable manner around the axis line with respect thereto, and a one-way clutch inserted around the movable sleeve in such a manner as to form a bottom surface of the V-shaped groove,*

*wherein the movable sleeve includes a tubular portion inserted around the axis-line-direction fixed member and a flange portion extending outward in a radial direction from the tubular portion,*

*wherein the one-way clutch includes an outer ring body inserted around the tubular portion and forming the bottom surface of the V-shaped groove, and is configured so that only a rotational power generated by a rotation of the outer ring body in a normal direction is transmitted to the tubular portion,*

*wherein the flange portion is provided with a pressing surface capable of engaging with one of the first and second side surfaces of the belt in a state where the inner circumferential surface of the belt engages with the outer ring body,*

*wherein the fixed sheave is provided with a concave portion into which the flange portion of the movable sleeve can be engaged,*

*wherein the driving-side pulley further includes a cam mechanism that presses the movable sleeve in a first direction by utilizing a relative rotation of the movable sleeve in the normal direction with respect to the axis-line-direction fixed member, the first direction being a direction that has the pressing surface pressed against a corresponding side surface of the belt,*

*wherein the cam mechanism includes a groove and a convex-like member capable of engaging into the groove, the groove and the convex-like member being arranged between a rear surface of the flange portion that is opposite the pressing surface and a bottom surface of the concave portion,*

*wherein the groove of the cam mechanism includes a deepest area with which the convex-like member engages when the movable sleeve is positioned at an initial position where the movable sleeve is engaged into the concave portion, and an inclined area with which the convex-like member engages when the movable sleeve rotates in a normal direction around the axis line with respect to the axis-line-direction fixed member from a state where the convex-like member engages with the deepest area, and*

*wherein the inclined area is inclined in such a manner as that an engagement point at which the convex-like member engages with the inclined area becomes narrower in the axial line direction as the movable sleeve farther rotates in the normal direction around the axis line with respect to the axis-line-direction fixed member.*

*11. A driving-side pulley according to claim 10 further comprising an auxiliary spring that presses the movable sleeve toward the initial position on a side of a second direction along the axis line that is opposite the first direction.*

*12. A driving-side pulley according to claim 11,*

*wherein the flange portion of the movable sleeve extends outward in a radial direction from an end portion of the tubular portion that is positioned on a side close to the fixed sheave and is configured so that the pressing surface is capable of engaging with the first side surface of the belt,*

*wherein when the movable sheave is pressed in a direction toward the fixed sheave by the flyweight mechanism that generates a force having an amount corresponding to the rotational speed of the driving shaft, the movable sleeve is moved via the belt by the movable sheave in a second direction opposite to the initial position, and*

*wherein the pressing surface is positioned on the same plane as the fixed sheave-side engagement surface when the movable sleeve is positioned at the initial position.*

*13. A driving-side pulley according to claim 12, wherein the fixed sheave-side engagement surface and the pressing surface are arranged with respect to the radial direction in such a manner that both the surfaces engage with the first side surface of the belt when the inner circumferential surface of the belt engages with the outer ring body while the movable sleeve is positioned at the initial position.*

*14. A driving-side pulley according to claim 11 further comprising: a spider that is arranged on a side opposite the fixed sheave across the movable sheave and is immovable along the axis line and non-rotatable around the axis line with respect to the driving shaft; and a base member that is arranged on a side opposite the movable sheave across the spider and is connected to the movable sheave via a connecting member,*

*wherein the flyweight mechanism includes a flyweight that is arranged between the movable sheave and the spider and swings outward in a radial direction of the driving shaft in accordance with the rotational speed of the driving shaft,*

*wherein the return spring is arranged between the spider and the base member, and*

*wherein the auxiliary spring is arranged inward of the flyweight with respect to the radial direction while being arranged between the spider and an end portion of the tubular portion that is on a side opposite the flange portion with respect to the axis line direction.*

*15. A driving-side pulley according to claim 10,*

*wherein the flange portion of the movable sleeve extends outward in a radial direction from an end portion of the tubular portion that is positioned on a side close to the fixed sheave and is configured so that the pressing surface is capable of engaging with the first side surface of the belt,*

*wherein when the movable sheave is pressed in a direction toward the fixed sheave by the flyweight mechanism that generates a force having an amount corresponding to the rotational speed of the driving shaft, the movable sleeve is moved via the belt by the movable sheave in a second direction in the axis line to the initial position, and*

*wherein the pressing surface is positioned on the same plane as the fixed sheave-side engagement surface when the movable sleeve is positioned at the initial position.*

*16. A driving-side pulley according to claim 15, wherein the fixed sheave-side engagement surface and the pressing surface are arranged with respect to the radial direction in such a manner that both the surfaces engage with the first side surface of the belt when the inner circumferential surface of the belt engages with the outer ring body while the movable sleeve is positioned at the initial position.*

*17. A driving-side pulley according to claim 10, wherein the groove of the cam mechanism is provided at the rear surface of the flange portion while the convex-like member is formed by a ball retained at the bottom surface of the concave portion in such a manner that the ball can be engaged into the groove of the cam mechanism.*

*18. A Continuously variable transmission comprising:*

*a driving-side pulley having a driving-side fixed sheave and a driving-side movable sheave rotatably coupled to a driving shaft;*

*a driven-side pulley having a driven-side fixed sheave and a driven-side movable sheave rotatably coupled to a driven shaft;*

*a convex-like portion positioned over the driving shaft and adjacent the driving-side fixed sheave of the driving-side pulley;*

*a movable sleeve operatively coupled to the driving shaft and generally positioned intermediate the driving-side fixed sheave and the driving-side movable sheave of the driving-side pulley, with a portion of the movable sleeve being adjacent the convex-like portion; and*

*the movable sleeve being rotatably fixed relative to the driving shaft when operating in a first direction and being cooperable with the convex-like portion to move the movable sleeve axially relative to the driving shaft and towards the driving-side movable sheave when operating in a second direction.*

*19. The Continuously variable transmission according to claim 18, wherein the movable sleeve comprises a flange portion and a tubular portion, the tubular portion being*

*positioned over the driving shaft and the flange portion being positioned adjacent to the driving-side fixed sheave of the driving-side pulley.*

*20. The Continuously variable transmission according to claim 19, wherein the driving-side fixed sheave of the driving-side pulley includes a concave portion to receive the flange portion.*

*21. The Continuously variable transmission according to claim 20, further comprising a one-way clutch positioned over the tubular portion of the movable sleeve.*

*22. The Continuously variable transmission according to claim 21, wherein the convex-like portion is positioned in the concave portion and cooperates with the movable sleeve to move the movable sleeve axially upon rotation of the movable sleeve in the second direction.*

*23. The Continuously variable transmission according to claim 22, further comprising a belt coupled between the driving-side pulley and the driven-side pulley, and positioned over the one-way clutch.*

*24. The Continuously variable transmission according to claim 22, wherein the driving-side fixed sheave and the driving-side movable sheave of the driving-side pulley rotate relative to the one-way clutch when rotating in the first direction.*

*25. The Continuously variable transmission according to claim 24, wherein the movable sleeve and the convex-like portion include a cam mechanism to move the movable sleeve axially.*

* * * * *